(12) United States Patent
Kinlen et al.

(10) Patent No.: US 10,685,761 B2
(45) Date of Patent: Jun. 16, 2020

(54) ELECTRICALLY CONDUCTIVE MATERIALS

(71) Applicant: THE BOEING COMPANY, Chicago, IL (US)

(72) Inventors: Patrick J. Kinlen, Fenton, MO (US); Daniel A. Charles, St. Louis, MO (US)

(73) Assignee: THE BOEING COMPANY, Chicago, IL (US)

( * ) Notice: Subject to any disclaimer, the term of this patent is extended or adjusted under 35 U.S.C. 154(b) by 802 days.

(21) Appl. No.: 15/252,072

(22) Filed: Aug. 30, 2016

(65) Prior Publication Data

US 2018/0061518 A1 Mar. 1, 2018

(51) Int. Cl.
*H01B 1/12* (2006.01)
*B32B 27/08* (2006.01)
(Continued)

(52) U.S. Cl.
CPC .............. *H01B 1/124* (2013.01); *B32B 27/08* (2013.01); *B64D 45/02* (2013.01); *C09D 5/24* (2013.01);
(Continued)

(58) Field of Classification Search
CPC ...... H05B 3/145; H05B 3/36; H05B 2214/02; H05B 2203/017; C01B 32/168; C01B 2202/24; C01B 2202/22; B64D 15/12; B64D 45/02; C08J 5/042; C08J 2363/00; C08J 2300/22; C08J 2300/24; C08J 2367/04; Y10S 977/847; Y10S 977/756; Y10S 977/932; Y10S 977/742; Y10S 977/753; C08K 2201/001; C08K 2003/0831; C08K 2003/0806; C08K 2003/085; C08K 3/08; C08K 3/04; B82Y 30/00; B82Y 40/00; B05D 3/007; H01B 1/124; H01B 1/04; H01B 1/127; H01B 1/128; C09D 7/61; C09D 7/70; C09D 7/62; C09D 125/18; C09D 5/24; C09D 133/00; C09D 153/00; C09D 163/00;
(Continued)

(56) References Cited

U.S. PATENT DOCUMENTS 5,716,550 A 2/1998 Gardner et al.
5,910,385 A 6/1999 Gardner et al.
(Continued)

OTHER PUBLICATIONS

Extended European Search Report for Application No. 17187917.4-1105 dated Jan. 23, 2018.
(Continued)

*Primary Examiner* — Shawntina T Fuqua
(74) *Attorney, Agent, or Firm* — Patterson + Sheridan, LLP

(57) ABSTRACT

Methods of forming an electrically conductive carbon allotrope material comprise depositing a first material comprising a polymer and a sulfonic acid onto a carbon allotrope material to form a second material. The methods comprise curing the second material. Methods of heating a surface of a vehicle component comprise applying a voltage to a material comprising a carbon allotrope material, a polymer, and a sulfonic acid. The material is disposed on a surface of a vehicle component. Electrically conductive materials comprise at least one polymer, at least one sulfonic acid, and a carbon allotrope material.

26 Claims, 8 Drawing Sheets

(51) Int. Cl.
    *C09D 7/61*         (2018.01)
    *C09D 7/40*         (2018.01)
    *C09D 7/62*         (2018.01)
    *B64D 45/02*       (2006.01)
    *C09D 5/24*         (2006.01)
    *C09D 125/18*      (2006.01)
    *C09D 133/00*      (2006.01)
    *C09D 153/00*      (2006.01)
    *C09D 163/00*      (2006.01)
    *C09D 165/00*      (2006.01)
    *C09D 175/04*      (2006.01)
    *C09D 179/02*      (2006.01)
    *H01B 1/04*        (2006.01)

(52) U.S. Cl.
CPC ............... *C09D 7/61* (2018.01); *C09D 7/62* (2018.01); *C09D 7/70* (2018.01); *C09D 125/18* (2013.01); *C09D 133/00* (2013.01); *C09D 153/00* (2013.01); *C09D 163/00* (2013.01); *C09D 165/00* (2013.01); *C09D 175/04* (2013.01); *C09D 179/02* (2013.01); *H01B 1/04* (2013.01); *H01B 1/127* (2013.01); *H01B 1/128* (2013.01); *B32B 2264/108* (2013.01); *B32B 2307/302* (2013.01); *B32B 2313/04* (2013.01)

(58) Field of Classification Search
CPC .. C09D 165/00; C09D 175/04; C09D 179/02; B32B 27/08; B32B 2264/108; B32B 2307/302
See application file for complete search history.

(56) References Cited

U.S. PATENT DOCUMENTS

| | | |
|---|---|---|
| 6,310,133 B1 | 10/2001 | Katashima et al. |
| 6,577,358 B1 | 6/2003 | Arakawa et al. |
| 2005/0165155 A1 | 7/2005 | Blanchet-Fincher |
| 2011/0059317 A1 | 3/2011 | Elhard et al. |
| 2013/0323503 A1* | 12/2013 | Radkowski ............ B82Y 30/00 428/336 |
| 2014/0147180 A1* | 5/2014 | Qi ...................... G03G 15/2057 399/333 |
| 2014/0363291 A1 | 12/2014 | Gaillardon et al. |

OTHER PUBLICATIONS

M.R. Mahmoudian, et al., Effect of narrow diameter polyaniline nanotubes and nanofibers; in polyvinyl butyral coating on corrosion protective performance; of mild steel, Progress in Organic Coatings, vol. 75, Issue 4, Dec. 2012 pp. 301-308.

Qianqian Lin, et al., Highly sensitive and ultrafast response surface acoustic wave humidity sensor based on; alectrospun polyaniline/poly(vinyl butyral) nanofibers, Analytica Chimica Acta, vol. 748, Oct. 20, 2012, pp. 73-80.

T. Pan, et al, a polyaniline based intrinsically conducting coating for; corrosion protection of structural steels, Microsc Res Tech. Nov. 2013; 76(11), pp. 1186-95.

Jae-Woo Kim, et al., Polyaniline/Carbon Nanotube Sheet Nanocomposites: Fabrication and; Characterization, ACS Appl. Mater. Interfaces, 2013, 5 (17), pp. 8597-8606.

European Examination Report for Application No. 17 187 917.4-1105 dated Oct. 23, 2018.

* cited by examiner

ELECTRICALLY CONDUCTIVE MATERIALS

FIELD

Aspects of the present disclosure comprise electrically conductive materials and methods of making and use thereof.

BACKGROUND

A surface of a vehicle, such as an aircraft, in motion builds static charge. For example, an aircraft has one or more radars located behind the nose of the aircraft. The nose may build a form of static electricity known as precipitation static (P-static).

Surface coatings may be applied to aircraft components to protect surfaces of the aircraft components. However, conventional surface coating(s) of vehicle components of an aircraft are typically not highly conductive, having resistivity of hundreds of kOhms to tens of MegaOhms. Accordingly, conventional surface coatings of an aircraft can allow charge buildup on surfaces (and other components) of the aircraft. In addition to an inability to dissipate charge buildup, conventional coatings might not have ideal "airworthiness" properties. For example, performance as to durability parameters such as rain erosion, resistance to UV light, resistance to high temperature, resistance to low temperature, inadequate flexibility, and resistance to sand and hail damage might not be ideal for conventional surface coatings on a surface of a vehicle exposed to extreme conditions, such as an aircraft. Furthermore, for coatings of a canopy of a fighter jet and/or windshield/window of a commercial aircraft or fighter jet, the coatings should be substantially clear to promote visibility through the surfaces.

In addition, if a conventional surface coating is mixed with additional chemicals to improve one or more desired physical properties of the coating, the coating is often incompatible with the additional chemicals, negating desired physical properties provided by the additional chemicals added to the coating. Conventional surface coatings are also often incompatible with underlying surfaces/coatings leading to adhesion degradation at the coating-coating interface.

In addition, cold weather conditions promote buildup of ice on vehicle surfaces. To remove ice, large amounts of chemicals are often sprayed onto the ice to promote melting. The large amounts of chemicals are a cost burden on a user of the vehicle.

What is needed in the art are materials that are both conductive and otherwise airworthy and methods of making and using the materials.

SUMMARY

In at least one aspect, a method of forming an electrically conductive carbon allotrope material comprises depositing a first material comprising a polymer and a sulfonic acid onto a carbon allotrope material to form a second material. The method comprises curing the second material.

In at least one aspect, a method of heating a surface of a vehicle component comprises applying a voltage to a material comprising a carbon allotrope material, a polymer, and a sulfonic acid. The material is disposed on a surface of a vehicle component.

In at least one aspect, an electrically conductive material comprises at least one polymer, at least one sulfonic acid, and a carbon allotrope material.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this present disclosure and are therefore not to be considered limiting of its scope, for the present disclosure may admit to other equally effective aspects.

To facilitate understanding, identical reference numerals have been used, where possible, to designate identical elements that are common to the figures. It is contemplated that elements and features of one aspect may be beneficially incorporated in other aspects without further recitation.

DETAILED DESCRIPTION

Figure 1:
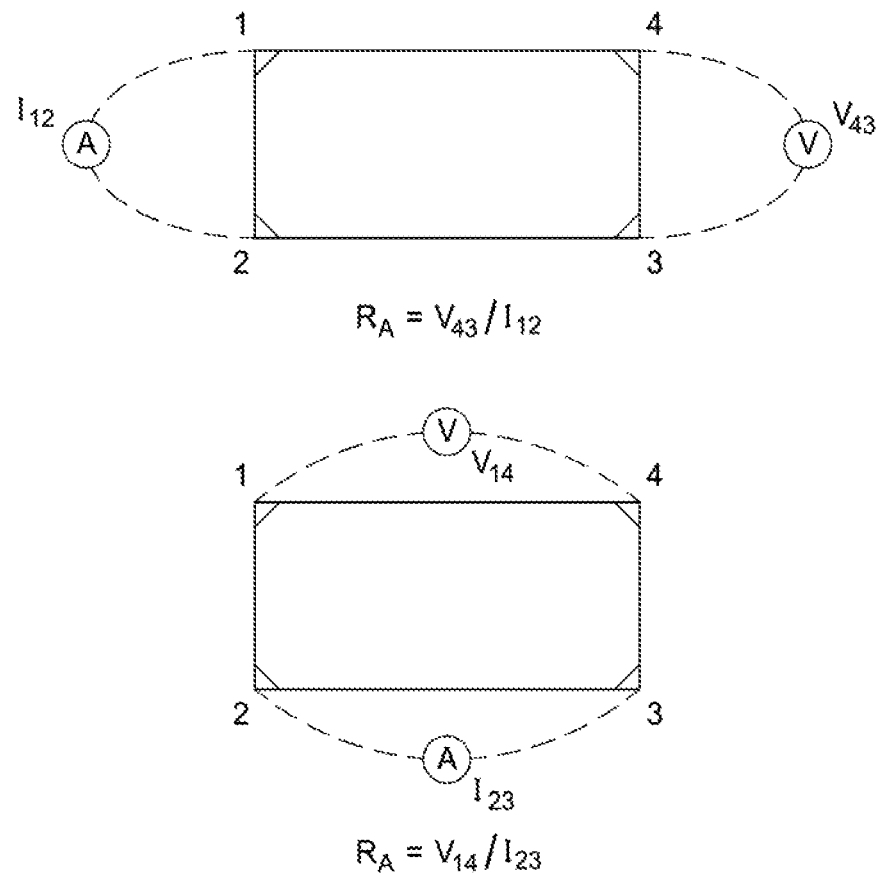
FIG. 1 illustrates possible electrode arrangements for resistance measurements, according to some aspects of the present disclosure.

Materials of the present disclosure are made of a polymer, a carbon allotrope material, and a sulfonic acid. In at least one aspect, materials of the present disclosure comprise a second polymer.

The present disclosure relates to electrically conductive materials, such as electrostatic dissipative materials useful for components subjected to static buildup in use. Electrically conductive materials generally include high conductivity in addition to other ideal airworthiness properties. In at least one aspect, an electrically conductive material is made of a carbon allotrope material, a first polymer, and a sulfonic acid (e.g., DNNSA). A first polymer and/or sulfonic acid may be disposed on carbon allotrope material (e.g., as a layer) and/or may be disposed in the carbon allotrope material (e.g. present in a cavity of the carbon allotrope material). Carbon allotrope material comprises multi-walled carbon-nanotubes such as single-walled carbon nanotubes (SWNTs) and/or double-walled carbon nanotubes (DWNTs), graphenes, polycarbonates, fullerenes, and/or mixtures thereof. Carbon allotrope material of the present disclosure provides additional electrical, mechanical, and/or thermal control of a material. In at least one aspect, a carbon allotrope material is conductive, porous, and/or woven (ordered) or non-woven (disordered) sheets of organic and/or inorganic material. In at least one aspect, a carbon allotrope material is a metal-coated carbon allotrope material, for example, metal-coated carbon nanotubes. Metals comprise nickel and/or copper.

In at least one aspect, the carbon allotrope material is a sheet of carbon allotrope material. The sheet material provides a material with improved flexibility and tensile strength. Sheet material can be multilayered comprising a plurality of sheet materials. For example, one or more graphene layers are deposited followed by deposition of one or more conductive polymers and a sulfonic acid onto the graphene layers and/or impregnated between the graphene layers.

In at least one aspect, materials of the present disclosure further comprise a fiber material. Fiber material comprises graphite, carbon-fiber, fiberglass, nylon, aramid polymers, polyethylenes, or mixtures thereof. For example, a fiberglass veil comprises a carbon nanotube coating, each of which comprises one or more conductive polymers and one or more sulfonic acids. The fiber material is woven or non-woven. Non-woven fibers comprise, for example, fiberglass, fiberglass cloth, carbon-fiber, and/or mixtures thereof. Woven material and/or non-woven material provide further tuning of electrical and mechanical properties of materials of the present disclosure.

In at least one aspect, a material comprising a carbon allotrope material has an electrical conductivity value (e.g., Ohms/square) between about 1.2 times (x) and about 20x higher than an Ohms/square value of the carbon allotrope material alone and/or the material without the carbon allotrope material, such as between about 1.5x and about 10x, such as between about 2x and about 5x, for example about 2x, about 3x, about 4x, about 5x. In at least one aspect, a material comprising a carbon allotrope material has a mechanical strength value (e.g., tensile strength: MPa) between about 1.2x and about 20x higher than a mechanical strength value of the carbon allotrope material alone and/or the material without the carbon allotrope material, such as between about 1.5x and about 10x, such as between about 2x and about 5x, for example about 2x, about 3x, about 4x, about 5x. In at least one aspect, a material comprising a carbon allotrope material has a thermal conductivity value between about 1.2x and about 20x higher than a thermal conductivity value of the carbon allotrope material alone and/or the material without the carbon allotrope material, such as between about 1.5x and about 10x, such as between about 2x and about 5x, for example about 2x, about 3x, about 4x, about 5x. In at least one aspect, a material comprises between about 20 wt % and about 80 wt % of a carbon allotrope material, such as between about 40 wt % and about 60 wt %, for example about 40 wt %, about 45 wt %, about 50 wt %, about 55 wt %, about 60 wt %. In at least one aspect, a material comprises between about 10 wt % and about 25 wt % of a carbon allotrope material, for example 10 wt %, 15 wt %, 20 wt %, 25 wt %.

In at least one aspect, a first polymer is a polyaniline (PANI), a poly(ethylenedioxythiophene) (PEDOT), a poly(styrenesulfonate) (PSS), a polyurethane, a polyvinyl butyral, a polyacrylate, an epoxy, a glycidyl-Si—Zr-containing solgel, a polyester, a phenoxy resin, a polysulfide, mixtures thereof, or salts thereof. A polyaniline may comprise between about 0.1 weight percent (wt %) and about 25 wt % of the material. In at least one aspect, a material may comprise between about 20 wt % and about 80 wt %, such as between about 40 wt % and about 60 wt %, for example about 40 wt %, about 45 wt %, about 50 wt %, about 55 wt %, about 60 wt %. A first polymer may be a mixture of a poly(ethylenedioxythiophene) and a poly(styrenesulfonate), and the mixture may be between about 1 wt % and about 50 wt % of the material, such as between about 10 wt % and about 25 wt %, for example 10 wt %, 15 wt %, 20 wt %, 25 wt %.

In at least one aspect, an electrically conductive material is made of a carbon allotrope material, a first polymer, a second polymer, and a sulfonic acid. A carbon allotrope material and first polymer are as described above. A second polymer is a polyurethane, a polyvinyl butyral, a polyacrylate, an epoxy, a glycidyl-Si—Zr-containing solgel, a polyester, a phenoxy resin, a polysulfide, mixtures thereof, or salts thereof.

A carbon allotrope material, a first polymer, and/or a second polymer is unsubstituted, monosubstituted, or multiplysubstituted (e.g., disubstituted, trisubstituted, or tetrasubstituted) where each instance of substitution is selected from alkyl (e.g., C1-C20 alkyl), aryl, amino, nitro, and halo (—F, —Cl, —Br, —I). As used herein, "unsubstituted" includes a molecule having a hydrogen atom at each position on the molecule that would otherwise be suitable to have a substituent. As used herein, "substituted" includes a molecule having a substituent other than hydrogen that is bonded to a carbon atom or nitrogen atom. In at least one aspect, a material is made of between about 20 wt % and about 80 wt % of a second polymer, such as between about 40 wt % and about 60 wt %, for example about 40 wt %, about 45 wt %, about 50 wt %, about 55 wt %, about 60 wt %. The second polymer may be a polyurethane or a polyvinyl butyral. A polyvinyl butyral may comprise between about 10 wt % and about 40 wt % of the material, such as between about 10 wt % and about 25 wt %, for example 10 wt %, 15 wt %, 20 wt %, 25 wt %.

A sulfonic acid decreases resistivity of an electrically conductive material of the present disclosure.

Sulfonic acid may be a naphthylsulfonic acid of Formula (I):

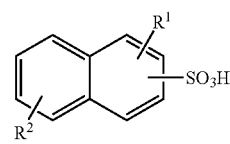

Each benzene ring of Formula (I) is unsubstituted, monosubstituted, disubstituted, trisubstituted, or tetrasubstituted with $R^1$ or $R^2$, as appropriate. Each instance of $R^1$ is independently selected from alkyl (e.g., C1-C20 alkyl), aryl, amino, nitro, and halo (—F, —Cl, —Br, —I), and each instance of $R^2$ is independently selected from alkyl (e.g., C1-C20 alkyl), aryl, amino, nitro, and halo (—F, —Cl, —Br, —I). C1-C20 alkyl substituted naphthylsulfonic acid comprises dinonylnaphthylsulfonic acid, methylnaphthylsulfonic acid, ethylnaphthylsulfonic acid, propylnaphthylsulfonic acid, butylnaphthylsulfonic acid, pentylnaphthylsulfonic acid, hexylnaphthylsulfonic acid, heptylnaphthylsulfonic acid, octylnaphthylsulfonic acid, nonylnaphthylsulfonic acid, decylnaphthylsulfonic acid, dimethylnaphthylsulfonic acid, diethylnaphthylsulfonic acid, dipropylnaphthylsulfonic acid, dibutylnaphthylsulfonic acid, dipentylnaphthylsulfonic acid, dihexylnaphthylsulfonic acid, diheptylnaphthylsulfonic acid, dioctylnaphthylsulfonic acid, didecylnaphthylsulfonic acid.

| Chemical Name | Non-limiting Example Chemical Structures |
|---|---|
| dinonylnaphthylsulfonic acid | 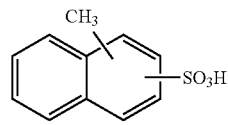 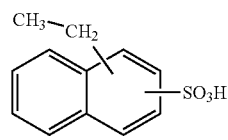 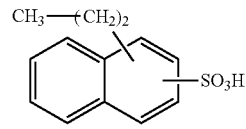 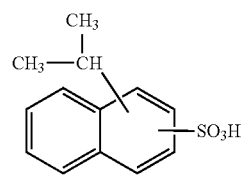 |
| methylnaphthylsulfonic acid | 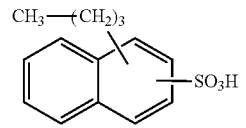 |
| ethylnaphthylsulfonic acid | 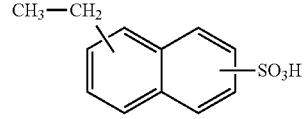 |
| propylnaphthylsulfonic acid | 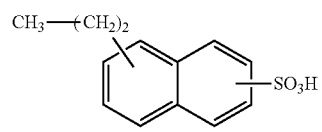 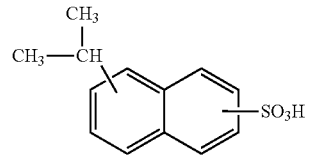 |
| butylnaphthylsulfonic acid | 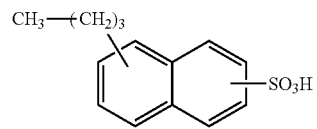 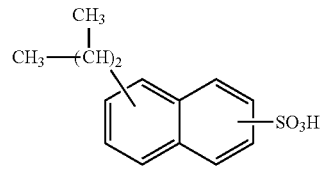 |

-continued
| Chemical Name | Non-limiting Example Chemical Structures |
|---|---|
| | 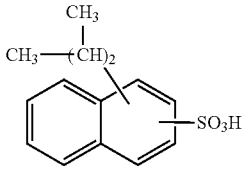 |
| pentylnaphthylsulfonic acid | 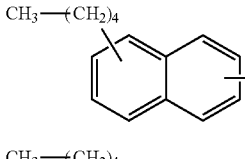 |
| | 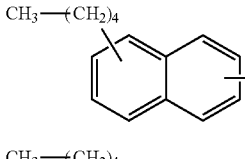 |
| | 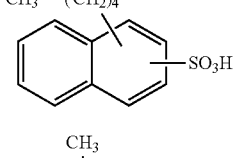 |
| | 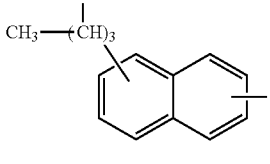 |
| hexylnaphthylsulfonic acid | 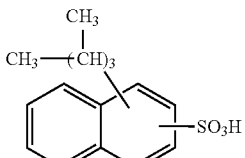 |
| | 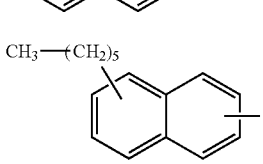 |
| | 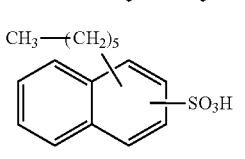 |
| | 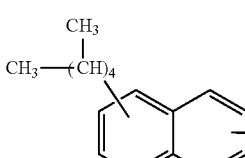 |
| heptylnaphthylsulfonic acid | 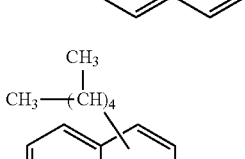 |
-continued
| Chemical Name | Non-limiting Example Chemical Structures |
|---|---|
| | 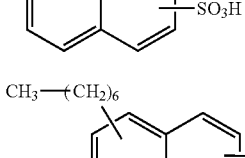 |
| | 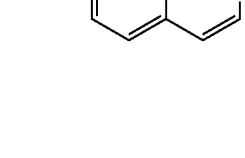 |
| |  |
| octylnaphthylsulfonic acid | 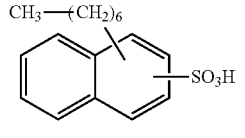 |
| | 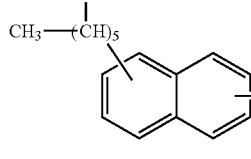 |
| | 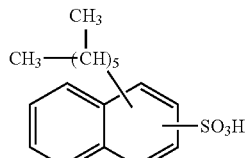 |
| | 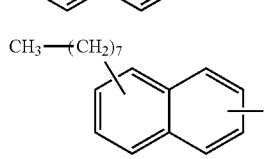 |
| nonylnaphthylsulfonic acid | 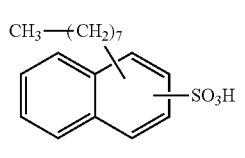 |
| | 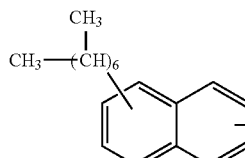 |
| | 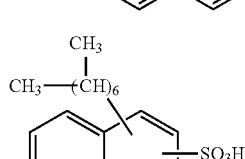 |

| Chemical Name | Non-limiting Example Chemical Structures |
|---|---|
| | [octylnaphthylsulfonic acid structure: CH3-(CH)-CH3 with (CH2)7 chain on naphthalene-SO3H] |
| decylnaphthylsulfonic acid | [CH3-(CH2)9-naphthalene-SO3H] |
| | [CH3-(CH2)9-naphthalene-SO3H, different isomer] |
| | [CH3-(CH)-CH3 with (CH2)8 on naphthalene-SO3H] |
| | [CH3-(CH)-CH3 with (CH2)8 on naphthalene-SO3H, different isomer] |
| dimethylnaphthylsulfonic acid | [CH3, CH3 disubstituted naphthalene-SO3H] |
| | [CH3, CH3 disubstituted naphthalene-SO3H, different isomer] |
| diethylnaphthylsulfonic acid | [CH3-CH2, CH3-CH2 disubstituted naphthalene-SO3H] |
| | [CH3-CH2, CH3-CH2 disubstituted naphthalene-SO3H, different isomer] |
| dipropylnaphthylsulfonic acid | [CH3-(CH2)2, CH3-(CH2)2 disubstituted naphthalene-SO3H] |

| Chemical Name | Non-limiting Example Chemical Structures |
|---|---|
| | [CH3-(CH2)2, CH3-(CH2)2 disubstituted naphthalene-SO3H, different isomer] |
| | [diisopropyl disubstituted naphthalene-SO3H] |
| | [diisopropyl disubstituted naphthalene-SO3H, different isomer] |
| dibutylnaphthylsulfonic acid | [CH3-(CH2)3, CH3-(CH2)3 disubstituted naphthalene-SO3H] |
| | [CH3-(CH2)3, CH3-(CH2)3 disubstituted naphthalene-SO3H, different isomer] |
| | [di-sec-butyl disubstituted naphthalene-SO3H] |
| | [di-sec-butyl disubstituted naphthalene-SO3H, different isomer] |

| Chemical Name | Non-limiting Example Chemical Structures | | Chemical Name | Non-limiting Example Chemical Structures |
|---|---|---|---|---|
| dipentylnaphthylsulfonic acid | 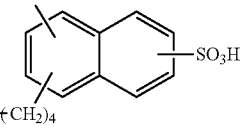 | | | 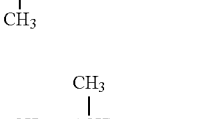 |
| dihexylnaphthylsulfonic acid | 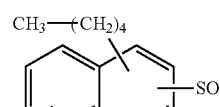 | | diheptylnaphthylsulfonic acid | 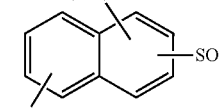 |
| | 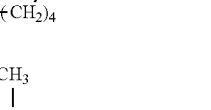 | | |  |
| | 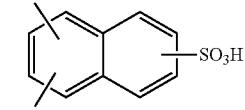 | | dioctylnaphthylsulfonic acid | 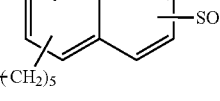 |

| Chemical Name | Non-limiting Example Chemical Structures |
|---|---|
| | 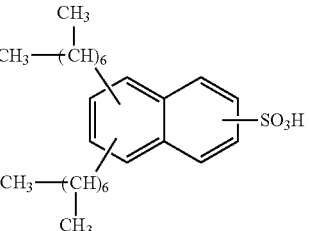 |
| | 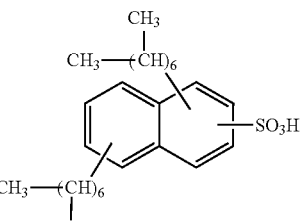 |
| didecylnaphthylsulfonic acid | 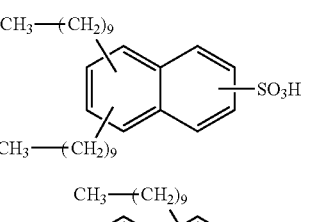 |
| | 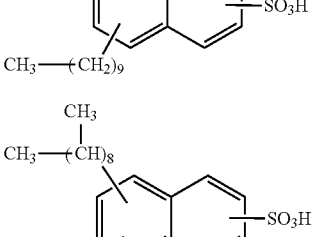 |
| | 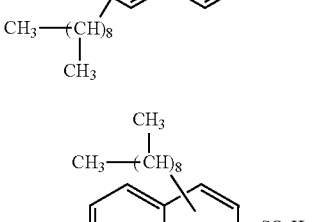 |
| | 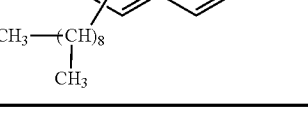 |

An electrically conductive material may comprise a naphthylsulfonic acid between about 1 wt % and about 50 wt %, such as between about 3 wt % and about 25 wt %, such as between about 10 wt % and about 15 wt %, for example 5 wt %, 10 wt %, 15 wt %. Other sulfonic acids are phenyl sulfonic acids, anthracenyl sulfonic acids, pyrenyl sulfonic acids, each of which is unsubstituted, monosubtituted or multiplysubstituted, where each instance of substitution is independently alkyl (e.g., C1-C20 alkyl), aryl, amino, nitro, or halo (—F, —Cl, —Br, —I).

In at least one aspect, a substrate is a component, such as a vehicle component, and one or more materials of the present disclosure disposed onto the component. Materials disposed on a substrate (e.g., as a layer) are applied between about 0.1 µm and about 100 µm in thickness, such as between about 1 µm and about 8 µm, such as between about 2 µm and about 6 µm, for example about 0.1 µm, about 1 µm, about 2 µm, about 3 µm, about 4 µm, about 5 µm, about 6 µm, about 7 µm, about 8 µm, about 9 µm, about 10 µm. In at least one aspect, materials have a resistance of between about 1e+4Ω/□ and about 1e+8Ω/□, for example about 1e+4Ω/□, about 1e+5Ω/□, about 1e+6Ω/□, about 1e+7Ω/□, about 1e+8Ω/□. Conductivity, which is the inverse of resistivity, provides electrostatic dissipation.

A vehicle may be any suitable transportation device. Vehicles comprise aircraft, automobiles, boats, motorcycles, satellites, rockets, missiles, etc., and therefore further comprise manned and unmanned aircraft, manned and unmanned spacecraft, manned and unmanned terrestrial vehicles, manned and unmanned non-terrestrial vehicles, and even manned and unmanned surface and sub-surface water-borne marine vehicles, objects, and structures.

A vehicle component may comprise one or more materials of the present disclosure disposed on one or more surfaces of the vehicle component. Materials comprise a carbon allotrope material, a first polymer, and a sulfonic acid, as described above. Materials may comprise a carbon allotrope material, a first polymer, a second polymer, and a sulfonic acid, as described above. A carbon allotrope material, first polymer and/or second polymer are electrically conductive. A vehicle component comprises any component of a vehicle, such as a structural component, such as a panel or joint, of an aircraft, automobile, etc. A vehicle component comprises a nose of an aircraft, a fuel tank, a tail cone, a panel, a coated lap joint between two or more panels, a wing-to-fuselage assembly, a structural aircraft composite, a fuselage body-joint, a wing rib-to-skin joint, and/or other internal component.

An electrically conductive material comprises one or more reaction products of a first polymer in a solvent at a percent solids of between about 0.1 wt % and about 30 wt %, a polyol, an isocyanate, a carbon allotrope material, and a sulfonic acid. A first polymer is as described above. In at least one aspect, a polymer is present in a solvent to a % solids of between about 0.1 wt % and about 30 wt %, such as between about 1 wt % and about 15 wt %, for example about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %. A solvent comprises a xylene, a benzene, a toluene, dimethyl sulfoxide, water, or mixtures thereof. A sulfonic acid comprises a napthyl sulfonic acid.

In the methods that follow, a first polymer and a second polymer are as described above.

In at least one aspect, a method for forming an electrically conductive material comprises depositing a carbon allotrope material such as carbon nanotubes, graphenes, polycarbonates, and/or fullerenes onto a substrate, followed by curing to form a sheet material. The method further comprises depositing a first polymer and/or second polymer onto the sheet material to form a first material disposed on the substrate. A substrate may be a vehicle component, and a first material comprises a layer having a thickness of between about 0.1 µm and about 10 µm after deposition and/or curing, such as between about 1 µm and about 8 µm, such as between about 2 µm and about 6 µm, for example about 0.1 µm, about 1 µm, about 2 µm, about 3 µm, about 4 µm, about 5 µm, about 6 µm, about 7 µm, about 8 µm, about 9 µm, about 10 µm. The method comprises curing the first material. The method may comprise dissolving a first polymer and/or second polymer in a solvent before depositing a first polymer and/or a second polymer onto a carbon allotrope material. In at least one aspect, the carbon allotrope material is a sheet material. A solvent comprises a xylene, a benzene, a toluene, dimethyl sulfoxide, water, or mixtures thereof. Depositing comprises drop-casting, dip-coating, spray-coating, screen printing, slot-die coating, flow coating and/or ink-jet printing. Deposition conditions may be adjusted, which does not affect length of carbon allotrope material (which correlates to conductivity), aerial density of carbon allotrope material and weight density of carbon allotrope material (e.g., thinner veil in thickness and/or dispersion).

In at least one aspect, a method for forming an electrically conductive material comprises depositing a first polymer onto a carbon allotrope material to form a first material disposed on a substrate. In at least one aspect, the carbon allotrope material is a sheet material. A substrate may be a vehicle component, and a first material may have a thickness of between about 0.1 µm and about 10 µm after deposition, such as between about 1 µm and about 8 µm, such as between about 2 µm and about 6 µm, for example about 0.1 µm, about 1 µm, about 2 µm, about 3 µm, about 4 µm, about 5 µm, about 6 µm, about 7 µm, about 8 µm, about 9 µm, about 10 µm. The method comprises curing a first material. The method may comprise dissolving a first polymer in a solvent before depositing a first polymer onto a carbon allotrope material. A solvent comprises a xylene, a benzene, a toluene, dimethyl sulfoxide, water, or mixtures thereof. Depositing comprises drop-casting, dip-coating, spray-coating, screen printing, slot-die coating, flow coating and/or ink-jet printing.

In at least one aspect, a method for forming an electrically conductive material comprises depositing a first polymer and/or second polymer onto a carbon allotrope material disposed on a substrate to form a first material disposed on the substrate. In at least one aspect, the carbon allotrope material is a sheet material. A substrate may be a vehicle component, and a first material comprises a layer having a thickness of between about 0.1 µm and about 10 µm after deposition and/or curing, such as between about 1 µm and about 8 µm, such as between about 2 µm and about 6 µm, for example about 0.1 µm, about 1 µm, about 2 µm, about 3 µm, about 4 µm, about 5 µm, about 6 µm, about 7 µm, about 8 µm, about 9 µm, about 10 µm. The method may comprise curing a first material. The method may comprise dissolving a first polymer and/or second polymer in a solvent before depositing a first polymer and/or second polymer onto a carbon allotrope material. A solvent comprises a xylene, a benzene, a toluene, dimethyl sulfoxide, water, or mixtures thereof. Depositing comprises drop-casting, dip-coating, spray-coating, screen printing, slot-die coating, flow coating and/or ink-jet printing. The method further comprises depositing a carbon allotrope material such as carbon nanotubes, graphenes, polycarbonates, and/or fullerenes onto the first material, followed by curing, to form a second material having a carbon allotrope material. Deposition conditions may be adjusted, which does not affect length of carbon allotrope material for deposition (which correlates to conductivity), aerial density of carbon allotrope material for deposition and weight density of carbon allotrope material for deposition (e.g., thinner veil in thickness and/or dispersion). Thus, electrical properties of a material can be controlled by the content of the material, such as amount and type of polymer, sulfonic acid, solvent, etc.

In at least one aspect, a method for forming an electrically conductive material comprises mixing a first polymer and a second polymer to form a first material. The method comprises depositing a first material onto a carbon allotrope material disposed on a substrate to form a second material disposed on the substrate. In at least one aspect, the carbon allotrope material is a sheet material. A substrate may be a vehicle component, and a second material may have a thickness of between about 0.1 µm and about 10 µm after deposition, such as between about 1 µm and about 8 µm, such as between about 2 µm and about 6 µm, for example about 0.1 µm, about 1 µm, about 2 µm, about 3 µm, about 4 µm, about 5 µm, about 6 µm, about 7 µm, about 8 µm, about 9 µm, about 10 µm. The method comprises curing a second material. The method may comprise dissolving a first polymer in a solvent before mixing a first polymer with a second polymer. A solvent comprises a xylene, a benzene, a toluene, dimethyl sulfoxide, water, or mixtures thereof.

In at least one aspect, a method for forming an electrically conductive material comprises mixing a carbon allotrope material, a first polymer and a second polymer to form a first material. The method comprises depositing a first material onto a substrate to form a first material disposed on a substrate, followed by curing to form a second material having a carbon allotrope material. In at least one aspect, the carbon allotrope material is a sheet material. A substrate may be a vehicle component, and a first material and/or second material may have a thickness of between about 0.1 µm and about 10 µm after deposition, such as between about 1 µm and about 8 µm, such as between about 2 µm and about 6 µm, for example about 0.1 µm, about 1 µm, about 2 µm, about 3 µm, about 4 µm, about 5 µm, about 6 µm, about 7 µm, about 8 µm, about 9 µm, about 10 µm. The method may comprise dissolving a first polymer and/or second polymer in a solvent before mixing a carbon allotrope material, a first polymer, and a second polymer with each other. The solvent comprises a xylene, a benzene, a toluene, dimethyl sulfoxide, water, or mixtures thereof.

Methods of the present disclosure may comprise rinsing a first material and/or a second material with a rinsing agent. A rinsing agent comprises isopropyl alcohol, p-Toluenesulfonic acid, acetone, methanol, hydrates thereof, solvates thereof, or mixtures thereof. Rinsing may comprise spraying a rinsing agent onto a surface of a first material and/or second material for between about 1 second and about 10 minutes, such as between about 1 minute and 5 minutes. Rinsing may comprise spraying a rinsing agent onto a surface of a material of an amount of between about 1 mL and about 25 kL, such as between about 1 L and about 100 L, such as between about 1 L and about 5 L, for example 1 L, 2 L, 3 L, 4 L, 5 L. Rinsing may comprise rinsing a first material and/or second material with a second rinsing agent that is isopropyl alcohol, p-Toluenesulfonic acid, acetone, methanol, hydrates thereof, solvates thereof, or mixtures thereof. In at least one aspect, a rinsing agent is p-Toluene sulfonic acid and is a mixture of 1 wt % p-Toluenesulfonic acid in butoxyethanol. A rinsing agent comprises a mixture of dinonylnaphthyl sulfonic acid and isopropylalcohol. In at least one aspect, rinsing comprises dipping a first material and/or a second material into a rinsing agent for between about 1 second and about 1 minute.

For methods described herein, curing a first material and/or a second material may comprise raising a temperature of the material to a peak curing temperature and maintaining the peak curing temperature for between about 1 second and about 48 hours, such as between about 1 hour and about 10 hours. A peak curing temperature may be between about room temperature and about 200° C., such as between about 50° C. and about 90° C., for example 50° C., 60° C., 70° C., 80° C., 90° C.

For methods described herein, depositing a first material and/or a second material onto a substrate may be achieved by spin-coating a first material and/or a second material onto a surface of a substrate, such as a vehicle component, at a rate of between about 100 rpm and about 4,000 rpm, such as between about 500 rpm and about 2,000 rpm, for example about 500 rpm, about 1,000 rpm, about 1,500 rpm, about 2,000 rpm.

In at least one aspect, a method of heating a surface of a vehicle component comprises applying a voltage to a surface of a material of the present disclosure that is disposed on a vehicle component. The material comprises a carbon allotrope material and a first polymer. In at least one aspect, the carbon allotrope material is a sheet material. The material may further comprise a second polymer and/or sulfonic acid. Applying the voltage to the surface of the material at least partially melts solid water (ice) disposed on a surface of the vehicle component. A voltage may be an alternating current (AC) voltage of between about 10 Hertz and about 2000 Hertz, such as between about 500 Hertz and about 1,000 Hertz, for example 500 Hertz, 600 Hertz, 700 Hertz, 800 Hertz, 900 Hertz. A voltage may be an alternating current (AC) voltage of between about 10 volts and about 2000 volts, such as between about 100 volts and about 500 volts, for example about 100 volts, about 200 volts, about 300 volts, about 400 volts, about 500 volts.

A vehicle component may be a nose, a fuel tank, a tail cone, a panel, a coated lap joint between two or more panels, a wing-to-fuselage assembly, a structural aircraft composite, a fuselage body-joint, a wing rib-to-skin joint, and/or other internal component. A first polymer comprises a polyaniline, a poly(ethylenedioxythiophene), a poly(styrenesulfonate), or mixtures thereof, and a second polymer comprises a polyurethane, a polyvinyl butyral, a polyacrylate, an epoxy, a glycidyl-Si—Zr-containing solgel, a polyester, a phenoxy resin, a polysulfide, and mixtures thereof. A first polymer comprises a polyaniline, a poly(ethylenedioxythiophene), a poly(styrenesulfonate), or mixtures thereof, and a second polymer comprises a polyurethane, a polyvinyl butyral, a polyacrylate, an epoxy, a glycidyl-Si—Zr-containing solgel, a polyester, a phenoxy resin, a polysulfide, and mixtures thereof. A carbon allotrope material comprises carbon nanotubes, graphenes, polycarbonates, fullerenes, and combinations thereof. Sulfonic acids comprises naphthyl sulfonic acids, anthracenyl sulfonic acids, and/or pyrenyl sulfonic acids, each of which is unsubstituted, monosubtituted or multiplysubstituted, where each instance of substitution is independently alkyl (e.g., C1-C20 alkyl), aryl, amino, nitro, or halo (—F, —Cl, —Br, —I).

Materials of the present disclosure may be deposited onto a substrate, such as a surface of a vehicle component, by any suitable deposition method, such as drop-casting, dipping, spraying, brush coating, spin coating, roll coating, doctor-blade coating, or mixtures thereof. Materials of the present disclosure may be deposited onto one or more surfaces of a vehicle component, such as an inner surface (e.g., inner cavity), an outer surface, or both, of an aircraft component.

In at least one aspect, materials of the present disclosure may be an electrically conductive material made of a carbon allotrope material, a first polymer, and a sulfonic acid. Materials of the present disclosure may further be made of a second polymer. Carbon allotrope material comprises multi-walled carbon-nanotubes such as single-walled carbon nanotubes (SWNTs) and/or double-walled carbon nanotubes (DWNTs), graphenes, polycarbonates, and fullerenes. First polymers comprise polyanilines (PANIs), poly(ethylenedioxythiophene)s (PEDOTs), poly(styrenesulfonate)s (PSSs), polyurethanes, polyvinyl butyrals, acrylates, epoxies, glycidyl-Si—Zr-containing solgels, thermoplastics such as polyesters, resins such as phenoxy resins, sealants such as polysulfides, and mixtures thereof. Second polymers comprise polyanilines (PANIs), poly(ethylenedioxythiophene)s (PEDOTs), poly(styrenesulfonate)s (PSSs), polyurethanes, polyvinyl butyrals, acrylates, epoxies, glycidyl-Si—Zr-containing solgels, thermoplastics such as polyesters, resins such as phenoxy resins, sealants such as polysulfides, and mixtures thereof. Epoxies comprise partially cured epoxies, a particular addition of epoxies, two-component epoxy resin that includes a catalyst (such as HYSOL® EA 956 epoxy resin available from Henkel Corporation of Bay Point, Calif.), a two liquid system that includes both a resin and a hardener (such as EPOFIX resin available from Struers A/S of Ballerup, Denmark), triglycidyl ethers of aminophenol (such as Araldite MY 0500 or MY 0510 from Huntsman Advanced Materials (Monthey, Switzerland)), tetrafunctional epoxies such as N,N,N',N'-tetraglycidyl-m-xylenediamines (such as Araldite MY0720 or MY0721 from Huntsman Advanced Materials (Monthey, Switzerland)), and mixtures thereof. Epoxies also comprise a difunctional epoxy, such a Bisphenol-A (Bis-A) or Bisphenol-F (Bis-F)-based epoxies. Bis-A epoxy resin is available commercially as Araldite GY6010 (Huntsman Advanced Materials) or DER 331, which is available from Dow Chemical Company (Midland, Mich.). A Bis-F epoxy resin is available commercially as Araldite GY281 and GY285 (Huntsman Advanced Materials). Epoxies, for example, are suitable for thermosets on the outside of aircraft because they are durable.

Polyanilines comprise, for example, a polyaniline of Formula (II):

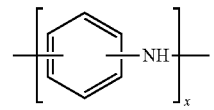

(where x is a positive integer, such as between about 10 and about 10,000), leucoemeraldine, emeraldine, and (per)nigraniline, mixtures thereof, salts thereof, and bases thereof. Polyanilines are unsubstituted, monosubstituted, or multiplysubstituted (e.g., disubstituted, trisubstituted, or tetrasubstituted) where each instance of substitution is independently alkyl (e.g., C1-C20 alkyl), aryl, amino, nitro, or halo (—F, —Cl, —Br, —I).

Poly(ethylenedioxythiophene)s comprise, for example, a poly(ethylenedioxythiophene) of Formula (III):

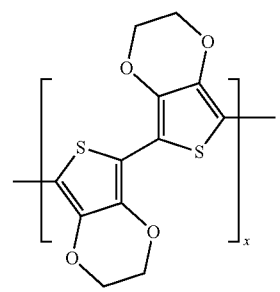

(where x is a positive integer, such as between about 10 and about 10,000) and/or salts thereof. Poly(ethylenedioxythiophene)s are unsubstituted, monosubstituted, or multiplysubstituted (e.g., disubstituted, trisubstituted, or tetrasubstituted) where each instance of substitution is selected from alkyl (e.g., C1-C20 alkyl), aryl, amino, nitro, and halo (—F, —Cl, —Br, —I).

Poly(styrenesulfonate)s comprise, for example, a poly(styrenesulfonate) of Formula (IV):

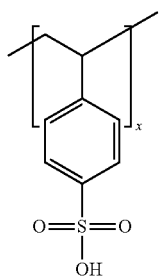

(where x is a positive integer, such as between about 10 and about 10,000) and/or salts thereof. Poly(styrenesulfonate)s comprise unsubstituted, monosubstituted, or multiplysubstituted (e.g., disubstituted, trisubstituted, or tetrasubstituted) where each instance of substitution is selected from alkyl (e.g., C1-C20 alkyl), aryl, amino, nitro, and halo (—F, —Cl, —Br, —I).

Acrylates comprise, for example, a polyacrylate of Formula (V):

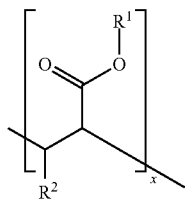

(where x is a positive integer, such as between about 10 and about 10,000) and/or salts thereof. $R^1$ and $R^2$ is independently C1-C20 alkyl or C1-C20 hydroxyalkyl. In at least one aspect, $R^2$ is methyl. Acrylates comprise hydroxyalkyl polyacrylates, hydroxyalkyl polymethacrylates, alkyl polyacrylates, and alkyl polymethacrylates. Examples of suitable hydroxyalkyl polyacrylates, or hydroxyalkyl polymethacrylates comprise poly(2-hydroxyethyl acrylate), poly(2-hydroxy-1-methylethyl acrylate), poly(2-hydroxypropyl acrylate), poly(3-hydroxypropyl acrylate), poly(2-hydroxybutyl acrylate), poly(4-hydroxybutyl acrylate), poly(2-hydroxyethyl methacrylate), poly(2-hydroxy-1-methylethyl methacrylate), poly(2-hydroxypropyl methacrylate), poly(3-hydroxypropyl acrylate), poly(2-hydroxybutyl methacrylate), poly(4-hydroxybutyl methacrylate) and the like, and acrylic acid or methacrylic acid esters of ethylene glycol and propylene glycol such as poly(diethylene glycol acrylate), and the like. Also useful are hydroxy-containing esters and/or amides of unsaturated acids such as maleic acid, fumaric acid, itaconic acid, and the like. In at least one aspect, a hydroxy-acrylic polymer comprises from 5 percent to 35 percent by weight of monoethylenically unsaturated hydroxy-containing monomers based on total acrylate weight, and in certain embodiments from 10 percent to 25 percent by weight. Alkyl polyacrylates and polymethacrylates comprises poly(methyl acrylate), poly(ethyl acrylate), poly(propyl acrylate), poly(isopropyl acrylate), poly(butyl acrylate), poly(isobutyl acrylate), poly(hexyl acrylate), poly(2-ethylhexyl acrylate), poly(nonyl acrylate), poly(lauryl acrylate), poly(stearyl acrylate), poly(cyclohexyl acrylate), poly(isodecyl acrylate), poly(phenyl acrylate), poly(isobornyl acrylate), poly(methyl methacrylate), poly(ethyl methacrylate), poly(propyl methacrylate), poly(isopropyl methacrylate), poly(butyl methacrylate), poly(isobutyl methacrylate), poly(hexyl methacrylate), poly(2-ethylhexyl methacrylate), poly(nonyl methacrylate), poly(lauryl methacrylate), poly(stearyl methacrylate), poly(cyclohexyl methacrylate), poly(isodecyl methacrylate), poly(phenyl methacrylate), poly(isobornyl methacrylate), and the like.

Polyurethanes comprise, for example, a polyurethane of Formula (VI):

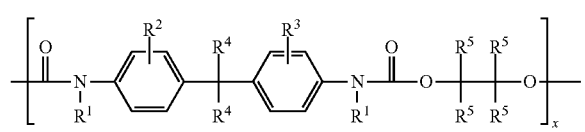

(where x is an integer between about 10 and about 10,000). Each instance of $R^1$, $R^2$, $R^3$, $R^4$, and $R^5$ is independently hydrogen or C1-C20 alkyl. Polyurethanes comprise, for example, Aptek 2100 A/B and Aerodur 3002 (available from Argosy International, Inc.). Polyurethanes are unsubstituted, monosubstituted, or multiplysubstituted (e.g., disubstituted, trisubstituted, or tetrasubstituted) where each instance of substitution is independently alkyl (e.g., C1-C20 alkyl), aryl, amino, nitro, or halo (—F, —Cl, —Br, —I).

Polymer Syntheses, Characterization, and Property Measurements

Polymers and carbon allotrope material of materials of the present disclosure may be commercially available or may be synthesized. Commercially available polymers comprise PANI, PEDOT:PSS, polyurethanes, and epoxies, and may be obtained from, for example, Heraeus or SigmaAldrich. Polymers of the present disclosure may be synthesized by mixing a plurality of monomers to form a mixture, followed by applying heat to polymerize the monomers. One or more polymerization catalysts may be added to a mixture to promote increased molecular weight (Mn and/or Mw) of a formed polymer. "Mn" is a number average molecular weight, and "Mw" is a weight average molecular weight. Commercially available carbon allotrope material comprises carbon nanotube sheets. In at least one aspect, polymers are synthesized in any suitable solvent or solvent mixture, for example, n-butanol, n-hexanol, diethyl ether, or mixtures thereof.

When materials of the present disclosure comprise DNNSA as the sulfonic acid, the polyaniline, for example, produced has a high molecular weight (e.g., >22,000) and a moderate conductivity (10-5 S/cm) and exhibits high solubility in a variety of solvents. In at least one aspect, the conductivity of materials of the synthesized polymers may be enhanced by about 5 orders of magnitude by treatment/rinsing with quaternary ammonium salts or solvents such as methanol, acetone, isopropyl alcohol, p-toluenesulfonic acid, salts thereof, and mixtures thereof. Without being bound by theory, conductivity increases with rinsing due to removal of excess sulfonic acid, densification of the polymer, and a resultant increase in crystallinity.

Example Preparation of Polyaniline Dinonylnaphthalene-sulfonic Acid Salt.

One tenth of a mole of DNNSA (as a 50% w/w solution in 2-butoxyethanol) was mixed with 0.06 mol of aniline and 200 mL of water to form a milky white emulsion with 2-butoxyethanol. The emulsion was chilled to 5° C., mechanically stirred, and blanketed with nitrogen. Ammonium peroxydisulfate (0.074 mol in 40 mL of water) was added dropwise to the mixture over a period of about 1 hour. The reaction was allowed to proceed for about 17 hours, during which time the emulsion separated into a green 2-butoxyethanol phase and a colorless aqueous phase. The progress of the synthesis was monitored by pH, OCP (open circuit potential, mV), and temperature.

The organic phase was washed three times with 100-mL portions of water, leaving a dark green, highly concentrated polyaniline phase in 2-butoxyethanol. This concentrate was soluble in xylene, from which thin materials may be cast. Addition of acetone to a portion of the above concentrate resulted in the precipitation of the polyaniline salt as a green powder. After thorough washing of the powder with acetone and drying, elemental analysis indicated a stoichiometric ratio of sulfonic acid to aniline of 1:2.

Molar ratios of PANI:DNNSA in the synthesized polymers may be differed by adjusting the molar ratio of aniline to DNNSA in the starting mixture. For example, PANI:DNNSA salts may be prepared using DNNSA/aniline molar ratios of 1:1, 1:2, and 1:5 while the peroxydisulfate/aniline mole ratio may be kept constant at 1.23:1. DNNSA to Aniline mole ratio of 1.7 provides an Mw(SEC/viscosity) value of 31,250. DNNSA to Aniline mole ratio of 0.5 provides an Mw(SEC/viscosity) value of 25,300. DNNSA to Aniline mole ratio as low as 0.2 provides an Mw(SEC/viscosity) value of 5,690.

Molecular Weight Determinations.

Molecular weight distribution averages may be determined by size exclusion chromatography (SEC). Chromatograms may be obtained with SEC systems, such as a model 150-CV SEC/viscometry (SEC/VISC) system (Waters Chromatography Inc.) and a multicomponent SEC system (Waters Chromatography Inc.) assembled from a model 590 pump, a model 712 autoinjector, a model 410 differential refractive index detector, and a model TCH column heater. Both SEC systems may be operated at 45° C. and employ a bank of two styragel SEC columns (Waters Chromatography Inc.) with mean permeabilities of 105 and 103 Å. UV-grade N-methylpyrolidone (NMP) (Burdick & Jackson Co.) modified with 0.02 M $NH_4HCO_2$ (Fluka Chemical Co.) may be used as the mobile phase and polymer solvent. A flow rate setting of 0.5 mL/min may be employed.

Calibration of the SEC may be performed with monodisperse polystyrene standards (Toya Soda Inc.) ranging in molecular weight from $1.1 \times 10^6$ to 2698. Intrinsic viscosities of the polystyrene calibrants may be measured using the SEC/viscometric detector. These values provide the Mark-Houwink expression for polystyrene in NMP/0.02 M $NH_4HCO_2$ at 45° C. for calibrating the size-exclusion chromatograph according to universal calibration:

$$[\eta](dL/g) = (1.947 \times 10^{-4})M^{0.66}$$

A linear least-squares fitting may be used to generate a universal calibration curve or a polystyrene-based molecular weight calibration curve.

Mark-Houwink constants for polyaniline may be determined from the set molecular weight distribution averages and intrinsic viscosities calculated for individual data points of SEC/VISC chromatograms. Data acquisition and reduction may be provided by TRISEC software (Viscotek Corp.). Reported molecular weight distribution averages may be means of two determinations.

The SEC/VISC chromatograms for deprotonated polyaniline salts are typically unimodal, and nearly baseline resolution of the PANI and its sulfonic acid component is observed. The sulfonic acid components separate from the polyaniline peak and are not included in the molecular weight calculations. In at least one aspect, the polyaniline salts produce broad size-exclusion chromatograms, with Mw/Mn (polydispersity)>1.5. A Mark-Houwink (M-H) plot for PANI-DNNSA (1:2) is linear with R=0.671 and log K=−3.146.

Absorption.

Absorption measurements may be made on a Cary 5000 spectrometer with the Universal Measurement Attachment (UMA) in air. Solution samples may be measured in a dilute solution of toluene in a 1 cm quartz cuvette. Sample rate may be between 1 nm and 2 nm depending on the breadth of wavelengths being studied. Solvent background should be obtained prior to sample measurement and later removed. Dry film measurements may be measured as spin-coated samples on glass slides, spin rate 1000 rpm for 30 s from solutions of xylene or toluene. A background transmission taken on a glass substrate should be measured. Samples should be oriented with the glass substrate side towards the light inlet, to minimize light scattering effects from uneven sample surfaces.

Resistance.

Resistance measurements may be made using any suitable set of electrodes and measurement apparatus, such as a Keithley 4200 SCS. Preferably, resistance measurements are made using the van der Pauw method. The four-point method uses parallel source and sense measurements of current and voltage, respectively, across a sample surface. Current and voltage polarities are switched across each junction to test for ambipolarity. Sample geometry should be held constant and allows for the direct comparison of samples. In order to account for differences in the charge directionality, the current and voltage measurements are rotated across each possible arrangement, as shown in Table 1 and FIG. 1. FIG. 1 illustrates possible electrode arrangements for resistance measurements.

TABLE 1

Possible electrode arrangements for resistance measurements

| R | Source I | Sense V |
|---|---|---|
| $R_A$ | 1-2 | 3-4 |
| $R_B$ | 2-3 | 4-1 |
| $R_C$ | 3-4 | 1-2 |
| $R_D$ | 4-1 | 3-2 |

Van der Pauw resistance measurements are performed by forcing a current across two adjacent electrodes and sensing the voltage drop across the sample in a parallel arrangement of electrodes.

The sheet resistance may be calculated from the ratio of V to I from the measured material. In the case of a sample showing truly isotropic resistance, $R_A=R_B=R_C=R_D$. In the case of isotropic resistances, e.g., where $R_A=R_B$, the sheet resistance is determined by the average of the two measured resistances, as shown in Equation 1 below. For samples with anisotropic resistances (the x-direction and y-direction demonstrate different resistances), calculating the sheet resistance becomes more complicated, which will be addressed in the following paragraph. For all samples where $R_A \neq R_C$ and $R_B \neq R_D$, the measurement is void. Equation 2 shows how the bulk resistivity, $\rho$, is determined if the material thickness, d, is known (typically resistivity is reported in $\Omega \cdot cm$, thus includes the use of d in cm), which is derived from the original Van der Pauw theorem. Bulk resistivity, $\rho$, can then be used to calculate conductivity, $\sigma$ (S·cm-1), which is inversely proportional (Equation 2).

$$R_S = \frac{R_A + R_B}{2} \qquad \text{Eqn. 1}$$

$$\rho = \frac{\ln(2)d}{\pi R_S} = \frac{1}{\sigma} \qquad \text{Eqn. 2}$$

Figure 2:
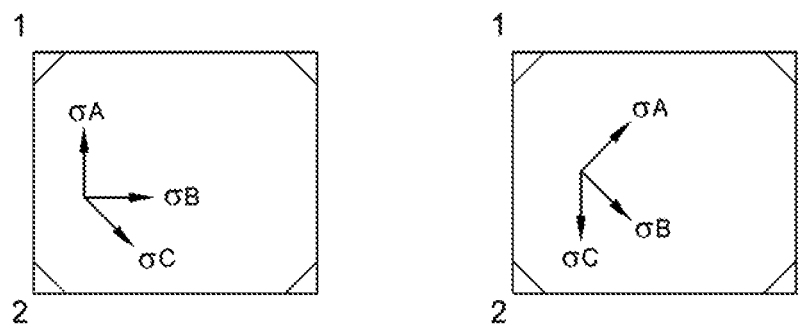
FIG. 2 illustrates an example van der Pauw measurement chip, according to some aspects of the present disclosure.

For cases where $R_A \neq R_B$, extracting conductivity values from the Van der Pauw equation becomes more difficult. In the case where the conductivity is not isotropic, the conductivity becomes a tensor value with x, y, and z dimensions. In the case of very thin materials, an accurate conductivity value may be obtained by taking the square of the product of the perpendicular conductivity measurement values, as shown in Equation 3 below. This calculation is only true if the directions being measured align with the tensor axes of the conductivity. It is assumed that the larger of the two resistances measured by the technique is exactly along the lowest conductivity tensor, and the lower of the resistance measurements is exactly along the highest conductivity tensor, as shown in FIG. 2. FIG. 2 illustrates an example van der Pauw measurement chip. If there were a misalignment of the conductivity tensor with the electrode/sample orientation, as shown in FIG. 2 right side, an inaccurate conductivity value would be measured.

$$\sigma = \sqrt{\sigma_A \cdot \sigma_B} \qquad \text{Eqn. 3}$$

For the van der Pauw measurement chip of FIG. 2, the numbers correspond to axis of the measurement while the sigmaX notations ($\sigma_A$, $\sigma_B$, and $\sigma_C$) represent the conductivity tensor directions. A mismatch of sample axis and tensor axis, as in the sample on the right, leads to inaccurately measured conductivities. The van der Pauw printed electrodes with the Keithley 4200 SCS provide a suitable device test bed for the measurement of samples.

In an effort to control the measurement humidity effects, a small sample probe station may be used to exclusively connect to the Keithley 4200 SCS for accurate van der Pauw measurements on the Dropsens prefabricated electrodes.

Electrochemical Impedance Spectroscopy (EIS).

EIS uses a variable frequency alternating current source to probe the changes to a sample's impedance at different frequencies. Impedance, similar to a resistor, is the lag between an applied alternating current and the measured voltage change. Electrical circuit components respond in frequency dependent ways, which can be used to identify specific properties of a coating being measured. True ohmic resistors respond identically to direct current (DC) and alternating current (AC) sources, and thus show no frequency-dependent resistive response. Capacitors (as well as more complex electrical components) have a frequency-dependent response; at low frequencies the impedance is very high but at high frequencies the electrical impedance is lower. In the analysis of EIS data, a predicted model, known as the equivalence circuit model, is made composed of real and approximated electrical components to closely approximate the sample system. The model's calculated impedance spectra are then compared to the measured spectra.

The impedance response of the material and its combined response as a capacitor and resistor may be determined. For goodness of fit, the fits may be obtained using the Gamry built in spectral fitting software. The Gamry program uses a $\chi^2$ fitting equation, Eqn. 4.

$$\chi^2 = \Sigma[(Zmeas_{real} - Zfit_{real})^2 + (Zmeas_{imag} - Zfit_{imag})^2] \qquad \text{Eqn. 4}$$

A perfectly matched predicted and measured impedance spectrum will result in $\chi^2 = 0$. In at least one aspect, a value of $\chi^2 < 10^{-4}$ is an acceptable "good fit". In at least one aspect, when comparing two different equivalent circuit models, a difference of less than one third of the value is deemed indistinguishable.

Polymer Materials

Materials of the present disclosure may be formed by depositing a first polymer onto a carbon allotrope material. Materials may also be formed by mixing a first polymer and a second polymer to form a first material and depositing a first material onto a carbon allotrope material. Materials may also be formed by depositing a first polymer onto a carbon allotrope material to form a first material and depositing a second polymer onto a first material to form a second material. A sulfonic acid may also be mixed with a first polymer, second polymer, and/or carbon allotrope material. Materials of the present disclosure may be materials that have been cured and/or washed with a rinsing agent such as isopropyl alcohol and/or p-Toluenesulfonic acid.

Materials of the present disclosure may be deposited onto a surface, such as a surface of a vehicle component, by any suitable method, such as drop-casting, dipping, spraying, brush coating, spin coating, roll coating, doctor-blade coating, or mixtures thereof. A material may be cured before or after application to a vehicle component surface. For example, a material may be deposited onto a vehicle component. Once deposited, a material may be heated at about 70° C. for about 3 to about 4 hours to cure a material. A higher temperature may be used to accelerate the curing process. Curing promotes evaporation of one or more solvents in a material, such as xylenes, toluene, and/or water.

Microstructure and Material Thickness.

Material thickness may be measured with white light interferometry, from a cut step height. Material surface microstructure may be observed with any suitable 3D laser scanning confocal microscope, such as a Keyence VK-X.

Example 1: PANI:DNNSA+Carbon Nanotube Sheet

A carbon nanotube sheet was obtained from General Nano Corp., product ID GN-N8-LD10. Polyaniline dinonyl-napthalene sulfonic acid (PANI-DNNSA) was synthesized as described above. Silver ink (AG530) was obtained from Conductive Compounds Corp. and used for electrical connections. 8663HS Polyurethane Protective Tape was obtained from 3M Company.

Resistance Measurements: 2.5 cm×2.5 cm squares of carbon nanotube sheet were coated with 0.5 ml PANI-DNNSA solution using a micropipette to carefully cover the area. The polymer solution provided a uniform coating. Silver ink was brush applied to opposite ends of the sheet for electrical contacts. The coated sheet was dried at 60° C. in a convection oven in air. Resistances of the sheets were calculated from current vs. voltage curves generated using a Keithley 4200-SCS system.

Electrical Heating: A 21 cm×7.5 cm piece of carbon nanotube sheet was placed over the top of 1 mm thick fiberglass panel. PANI-DNNSA solution was drop cast over the CNT sheet and silver ink was applied to opposite ends of the sheet. The panel was air dried at 90° C. Polyurethane tape was then applied to the coated panel as a protective layer. Power was applied to the panel using an automatic on-off timer (422ARR100S0X, Automatic Timing and Controls Co.) at selected intervals. A Variac Power source at 60 Hz was cycled 30 s on and 60 s off with Timer. Voltage applied and current measured were measured simultaneously with HP 34401A Multimeter. A fan was mounted to blow air directly onto the panel to keep it from overheating.

Figure 3:
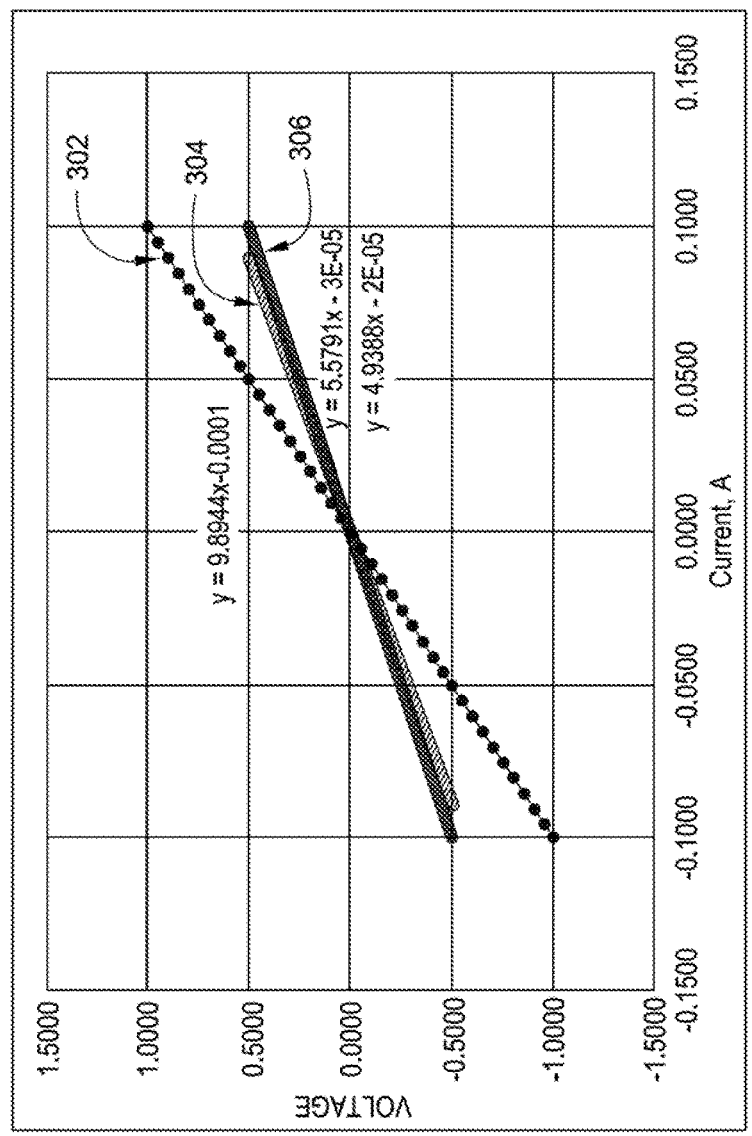
FIG. 3 illustrates current vs. voltage curves for carbon nanotube materials, according to some aspects of the present disclosure.

FIG. 3 illustrates current vs. voltage curves for carbon nanotube materials, according to some aspects of the present disclosure. As shown in FIG. 3, graph 300 shows current vs. voltage curves carbon nanotube sheet alone (line 302), PANI-DNNSA coated carbon nanotube sheet (line 304) and PANI-DNNSA coated carbon nanotube sheet washed with IPA (line 306). The results show a linear ohmic response and a significant (e.g., 2-fold) increase in conductivity/decrease in resistivity of materials that are carbon nanotube sheet coated with PANI-DNNSA (5.6 ohms/square) (line 304) versus carbon nanotube sheet alone (9.9 ohms/square) (line 306). The 21 cm×7.5 cm panel prepared as described above (line 304) had a resistance of 13.8 ohms. With a voltage of 27.8 volts AC applied to the panel, the current draw was 2.18 A or 60.6 Watts power (0.38 W/cm$^2$ or 2.7 W/in$^2$). In addition, washing a material with IPA provides a further increase in conductivity/decrease in resistivity (4.9 ohms/square) (line 306) versus unwashed PANI-carbon nanotube (5.6 ohms/square) (line 308). A second 2.5 cm×2.5 cm PANI-DNNSA carbon nanotube sample was prepared on a polycarbonate substrate. A resistance of 5 ohms/square was measured showing reproducibility of the method. Overall, PANI-DNNSA has been successfully incorporated into a carbon nanotube sheet yielding a conductive and flexible system with improved electrical and mechanical properties versus PANI-DNNSA or carbon nanotube sheet alone. A material comprising PANI-DNNSA-carbon nanotube sheet was demonstrated generating 2.7 W/in$^2$ that achieved temperatures between about 51° C. and about 62° C. in 30 seconds. Furthermore, washing a PANI-DNNSA-carbon nanotube sheet material with water does not dedope the DNNSA from the material. Indeed, sensitivity to humid conditions inhibits commercial viability of prior known materials as electrostatic dissipative materials for vehicle applications.

Comparative Example: PANI-Carbon Nanotube-HCl

PANI-carbon nanotube-HCl was prepared by in situ polymerization of aniline in an acidic solution bath (1 M HCl) with ammonium persulfate as the oxidant in the presence of the carbon nanotube sheet. The weight ratio between the sheet and aniline was 1:5, and the molar ratio between the aniline monomer and the oxidant is 1:1. DC-electrical conductivity of a CNT alone was found to be 342+/−37 S/cm, whereas PANI-carbon nanotube sheet-HCl provides a conductivity of 621+/−10 S/cm. Rinsing the material with water significantly alters the electrical properties of the material, further hindering the commercial viability of such a material. Furthermore, HCl is volatile at some curing temperatures and temperatures typically experienced by a surface of a vehicle component of an aircraft, which also significantly alters the electrical properties of the material, further hindering the commercial viability of such a material.

Example 2: PANI:DNNSA+Polyurethanes

Materials of the present disclosure are any suitable electrically conductive polymer(s) disposed on and/or in a carbon allotrope material. The material of Example 2 is shown in Table 2. Part A is a polyol with two or more hydroxyl groups. Part B is an isocyanate containing two or more isocyanate groups. Part C is PANI/DNNSA diluted with xylene and/or toluene to a percent solids of about 8%.

TABLE 2

| | | solid weights (g) | Actual Weights (g) | % of Material |
|---|---|---|---|---|
| Polyol | Part A | 3.497792 | 7.92 | 49.97% |
| Isocyanate | Part B | 0.697792 | 1.58 | 9.97% |
| PANI:DNNSA in Toluene | Part C | 2.804 | 6.35 | 40.06% |
| Total Wgt | | 7.000 | 15.850 | |

Mixing Procedure for Example 2:

PANI:DNNSA concentrate is diluted in xylene or toluene to a % solids of about 8% to form Part C. Part C is mixed with Part A thoroughly to make a uniform solution with substantially no aggregates or particles to form a Part A/Part C mixture. Part B is then added to the Part A/Part C mixture and mixed thoroughly. Although PANI:DNNSA concentrate of Example 2 is diluted in xylene or toluene to a % solids of about 8%, In at least one aspect, a polymer is present in a solvent to a % solids of between about 0.1 wt % and about 30 wt %, such as between about 1 wt % and about 15 wt %. Isocyanates comprise aryl isocyanates, aliphatic isocyanates, and cycloaliphatic isocyanates. In at least one aspect, isocyanates comprise toluene diisocyanate (TDI), methylene diphenyl diisocyanate (MDI), 1,6-hexamethylene diisocyanate (HDI), and mixtures thereof. Polyols comprise aryl polyols, aliphatic polyols, and cycloaliphatic polyols. In at least one aspect, polyols comprise C1-C15 polyol. In at least one aspect, Part A and Part B are synthesized or obtained commercially from Aptek (e.g., Aptek 2100), Huntsman Corporation (e.g., Huntsman 5750), BASF, Bayer AG, etc.

The material is drop cast onto a carbon allotrope material to form a second material disposed on a substrate surface, such as a surface of a vehicle component. Additionally or alternatively, the material may be disposed on the carbon allotrope material by dipping, spraying, brush coating, spin coating, roll coating, doctor-blade coating, or mixtures thereof. Once applied, the material is heated at about 70° C. for between about 3 to about 4 hours to cure the material. In at least one aspect, a higher temperature may be used to accelerate the curing process.

Curing a material promotes evaporation of a solvent (toluene, xylene, etc.) and controlled crosslinking of the polymers with suitable void space left by a solvent.

Figure 4:
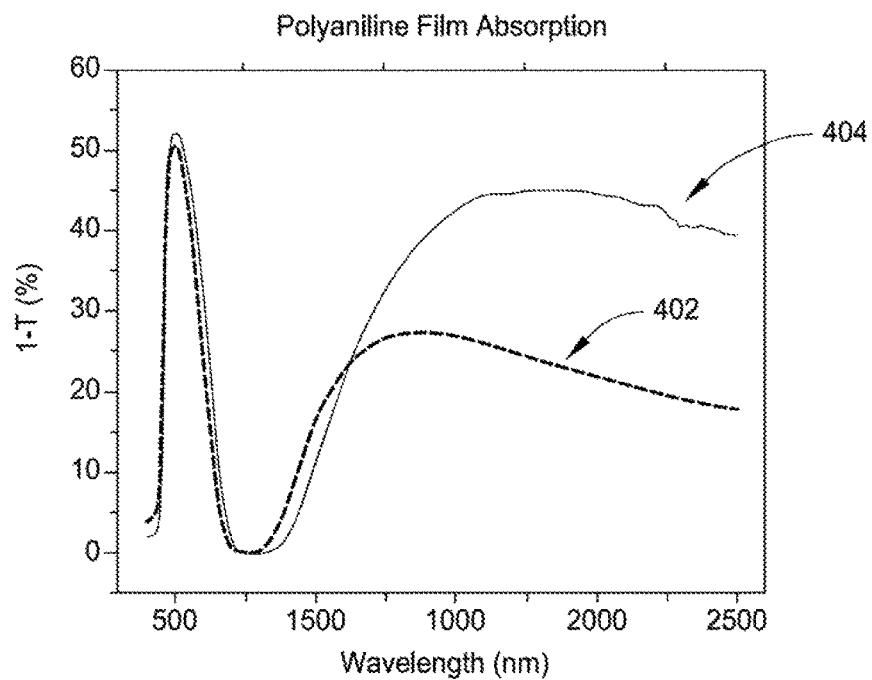
FIG. 4 illustrates absorptance of PANI materials in the visible and near infrared regions, according to some aspects of the present disclosure.

FIG. 4 illustrates absorptance of PANI materials in the visible and near infrared regions. Line 402 shows the apsorptance of a material comprising PANI:DNNSA:PTSA, while line 404 shows the apsorptance of a material comprising PANI:DNNSA. As shown in FIG. 4, the sharp peak at about 500 nm (of line 402 and line 404) corresponds to the bipolaron absorption while the broad absorption from about 1000-2500 nm results from infrared absorption by mobile holes. PANI's sharp peak at about 500 nm is attributed to a polaron having a DNNSA counterion. The free carrier part of the spectrum, e.g. the sigmoidal part that moves into the infrared region, is called the free carrier tail which is associated with conductivity of the polymer. A lower free carrier tail (or absence of a free carrier tail) indicates that a polymer has low (if any) conductivity. As shown in FIG. 4, the free carrier tail of a material comprising PANI:DNNSA: PTSA (line 402) is lower than the free carrier tail of a material comprising PANI:DNNSA (line 404) in the absence of PTSA.

Materials of doped-PANI (e.g., line 404) differ from that of the solution (in the absence of doped-PANI) by the inclusion of a very broad spectral feature in the infrared window, e.g. the carrier tail. The bipolaronic absorption feature in the visible region originates from the same structural entities of that in the solution absorption albeit blue-shifted by about 0.45 eV. Without being bound by theory, this shifting may be due to interchain interactions, including a parallel alignment of the chromophore dipole on adjacent polymer chains leading to H-like aggregation (which may be determined by emission spectroscopy). These materials are disposed on and/or in carbon allotrope material, such as carbon nanotubes, graphenes, fullerenes, polycarbonates, and combinations thereof, to form a second material with improved electrical and mechanical properties.

Example 3: PEDOT:PSS in Acrylate Polymer

PEDOT:PSS is a polymer system that is soluble in polar solvents, such as water and DMSO. This solubility provides water soluble dispersions with second polymers such as epoxies and/or polyurethanes.

Figure 5:
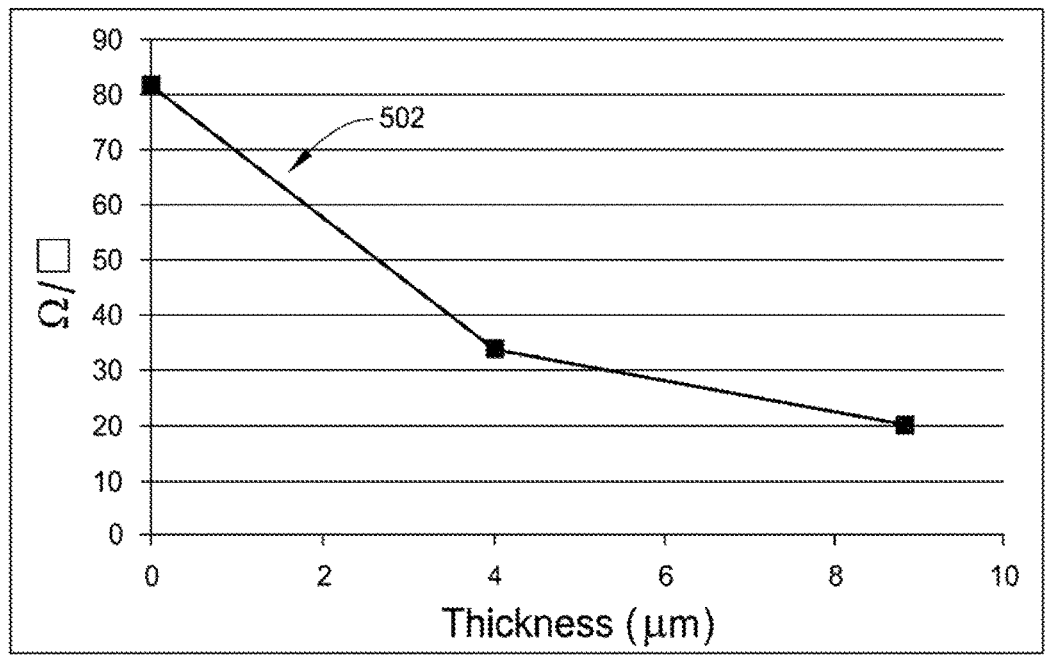
FIG. 5 illustrates resistance versus thickness of a PEDOT:PSS material, according to some aspects of the present disclosure.

The resistance of Example 3 starts off close to 500Ω/☐ and drops to almost 100Ω/☐ by the third layer while remaining very thin. This material provides electrostatic dissipative applications with a low loading of PEDOT:PSS. The concentration of the PEDOT:PSS can be increased to further lower the resistance of the material. In at least one aspect, a material comprises between about 0.1% by weight (wt) and about 50 wt % of PEDOT:PSS, such as between about 1 wt % and about 25 wt %, such as between about 1 wt % and about 10 wt %, for example about 5 wt %. FIG. 5 illustrates resistance versus thickness of a PEDOT: PSS material. As shown in FIG. 5, the resistance of the PEDOT:PSS (line 502) starts off low at about 70-80Ω/☐ with a dark blue material and decreases upon increasing thickness to about 20Ω/☐ with a dark blue material at a thickness of about 6 μm.

These materials are disposed on and/or in carbon allotrope material, such as carbon nanotubes, graphenes, fullerenes, polycarbonates, and combinations thereof, to form a second material with improved electrical and mechanical properties.

Rinse to Reduce Resistance

Materials of the present disclosure may be rinsed, for example, after deposition onto a surface and before or after curing, with one or more rinsing agents. Rinsing agents comprise isopropyl alcohol (IPA), p-Toluenesulfonic acid, acetone, methanol, salts thereof, and mixtures thereof. In at least one aspect, a material is coated onto a substrate and dipped into a solution containing one or more rinsing agents. In at least one aspect, a rinse comprises spraying a rinsing agent on a surface of a material deposited on a substrate. In at least one aspect, a rinsing agent is sprayed onto a surface of a material for between about 1 second and about 10 minutes, such as between about 30 seconds and about 2 minutes. In at least one aspect, a rinsing agent is sprayed onto a surface of a material in an amount of between about 1 mL and about 25 kL, such as between about 100 L and about 1 kL. In at least one aspect, a material having a higher resistance may be suitable for an application and, therefore, rinsing with a rinsing agent may be excluded. For example, resistance of an unrinsed PANI:DNNSA:Carbon nanotube coating(s) may be sufficient for a particular use, and the unrinsed PANI:DNNSA:carbon nanotube coating(s) may still be cured.

An IPA rinse, for example, removes some of excess sulfonic acid, such as DNNSA. Sulfonic acid removal promotes increased contact between polymer chains of a material and reduced resistance of a material. Rinse with a rinsing agent further promotes solubility of a material in a variety of solvents. The increased solubility facilitates deposition of a material onto a substrate because less solvent may be used for deposition as compared to unrinsed materials. A reduced amount of solvent for deposition provides faster curing times and reduced costs of production.

EIS has been used to help quantify the effects of rinsing with a rinsing agent on PANI material impedance. The capacitive nature of the material decreased with additional rinsing (e.g., dipping) and was lowest for materials dipped in IPA and then PTSA/PTSAM solutions. Materials comprising PANI:DNNSA incorporated into epoxy materials and carbon nanotubes with rinsing showed promise as conductive materials. In addition, PEDOT:PSS may be incorporated at even lower loadings (than typical PANI: DNNSA) to make conductive materials.

Example 4: PANI:DNNSA 40% wt in Polyurethane Rinsed with IPA

Figure 6A:
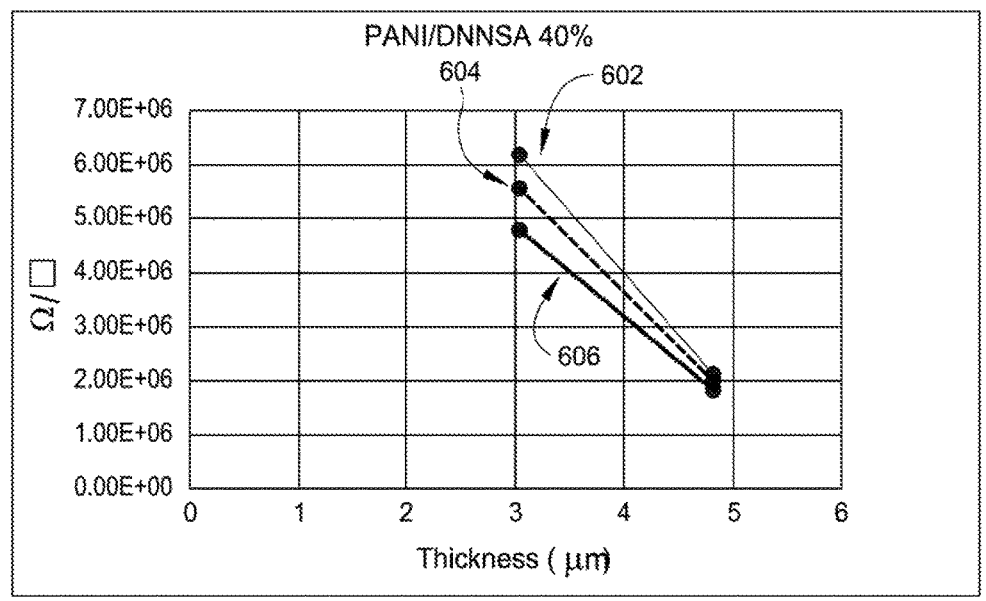
FIG. 6A illustrates resistance versus material thickness for PANI:DNNSA 40% in polyurethane, according to some aspects of the present disclosure.
Figure 6B:
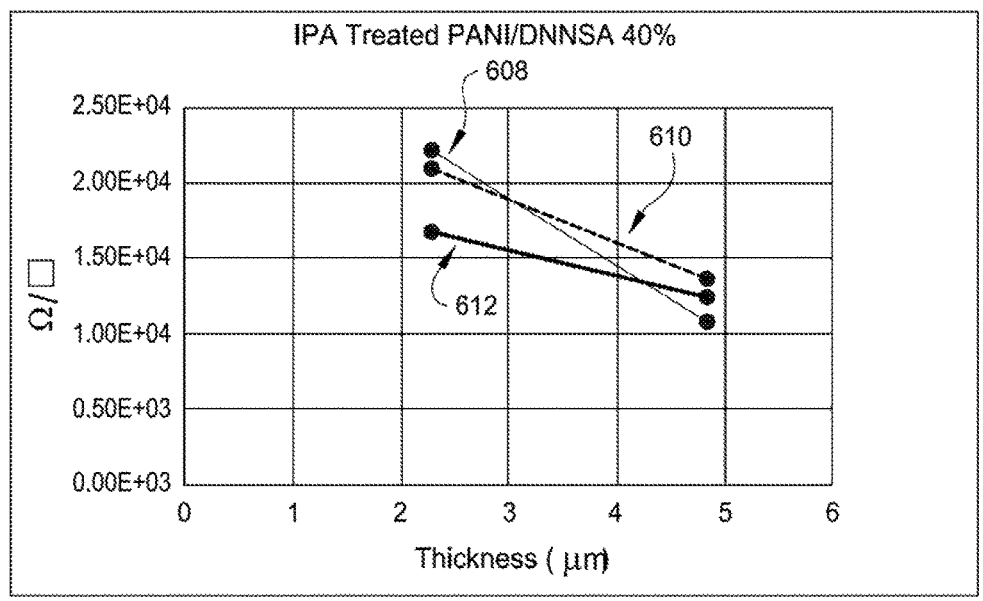
FIG. 6B illustrates resistance versus material thickness for PANI:DNNSA 40% wt in polyurethane rinsed with IPA, according to some aspects of the present disclosure.

FIG. 6A illustrates resistance versus material thickness for PANI:DNNSA 40% in polyurethane, while FIG. 6B illustrates resistance versus material thickness for PANI:DNNSA 40% wt in polyurethane rinsed with IPA. As shown in FIG. 6A, resistance of the materials for PANI:DNNSA 40% in polyurethane that were not rinsed with IPA (lines 602, 604, and 606) were in M Ω/☐ at thickness between about 3 μm and about 5 μm. However, as shown in FIG. 6B, the resistance of the materials after IPA rinse (lines 608, 610, and 612) reduces substantially with the IPA wash to k Ω/☐ between thicknesses of about 2 μm and about 5 μm. As shown in FIGS. 6A and 6B, resistance of the materials (lines 602, 604, 606, 608, 610, and 612) also reduces with increasing material thickness. These materials are disposed on and/or in carbon allotrope material, such as carbon nanotubes, graphenes, fullerenes, polycarbonates, and combinations thereof, to form a second material with improved electrical and mechanical properties.

Example 5: PANI:DNNSA Rinsed with Various Rinsing Agents

Figure 7:
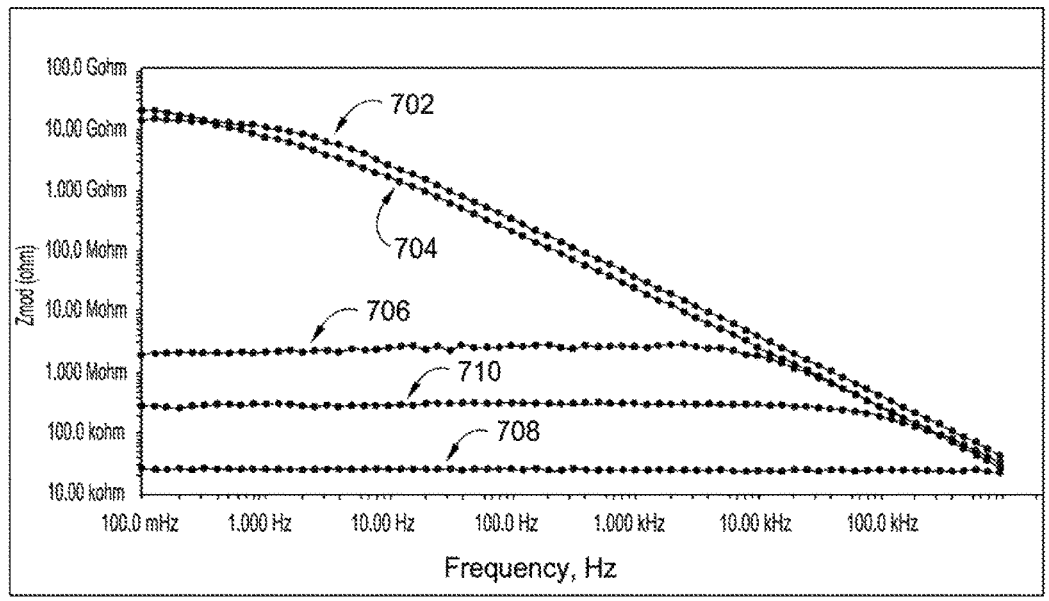
FIG. 7 illustrates a Bode plot of impedance spectra plotted as impedance versus frequency for a neat PANI:DNNSA material, according to some aspects of the present disclosure.

FIG. 7 illustrates a Bode plot of impedance spectra plotted as impedance versus frequency for a neat PANI:DNNSA material. The data for FIG. 7 was determined by EIS. Dipping treatments consisted of submersion into the noted rinsing agent or secondary dopant treatment for 10 s each. As shown in FIG. 7, impedance is highest for unrinsed PANI:DNNSA (line 702) and PANI:DNNSA rinsed with p-Toluenesulfonic acid (PTSA) (line 704). PANI:DNNSA rinsed with IPA (line 706) provides a material with reduced impedance as compared to the materials of lines 702 and 704. Furthermore, PANI:DNNSA sequentially rinsed with IPA, air dried and then rinsed with a solution of 1% PTSA/PTSAM in butoxyethanol (line 708) provides lower impedance than PANI:DNNSA sequentially rinsed with a solution of 1% PTSA/PTSAM in butoxyethanol, air dried and then rinsed with IPA (line 710), as well as the materials of lines 702, 704, and 706.

As shown in FIG. 7, the high impedance (y axis in Ohms) measured for PANI:DNNSA materials is analogous to the high DC resistivity. For the unrinsed sample (line 702), which each of the materials begins as, the impedance drops substantially with increased frequency, which is characteristic of the leaky capacitor model (trickle through current limited by the high R regions between highly crystalline regions).

The change of the material impedance from acting as a resistor and leaky capacitor to a purely resistive system is consistent with the observation that the dipping is creating a more interconnected polymer system (instead of isolated PANI crystal islands) and, accordingly, a lower resistance to electron transfer between areas of PANI, as shown in FIG. 7. The shrinking distance between highly conductive regions of PANI thus reduces the Rp value fit to the EIS data. This is further supported by considering the material shrinkage (thickness) that occurs with secondary dipping, e.g. IPA followed by PTSA.

One sample not included in FIG. 7 is that of a material dipped in a solution of DNNSA in IPA which measured a very low (~1 Ohm) and flat impedance. This would make the material very conductive and responding purely as a conductor with no CPE character. While the material was more conductive than its undipped precursor, it was not substantially better as EIS would suggest.

Figure 8:
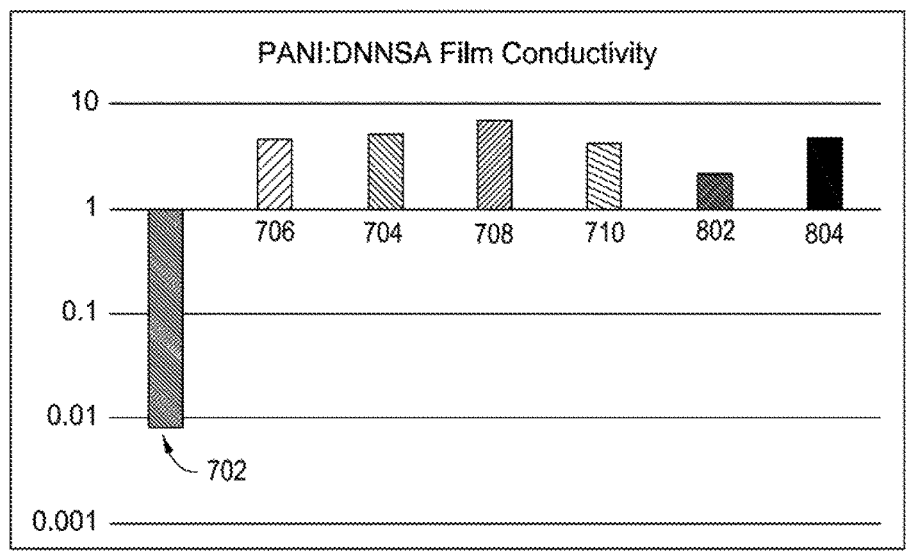
FIG. 8 is a bar graph illustrating relative conductivity of PANI:DNNSA materials cast on interdigitated electrodes and treated with a rinsing agent, according to some aspects of the present disclosure.

FIG. 8 is a bar graph illustrating relative conductivity of PANI:DNNSA materials cast on interdigitated electrodes and treated with a rinsing agent. As shown in FIG. 8, unrinsed PANI:DNNSA (bar 702) has a low conductivity as compared to PANI:DNNSA rinsed with IPA (bar 706), PANI:DNNSA rinsed with PTSA (bar 704), PANI:DNNSA rinsed with IPA followed by PTSA (bar 708), PANI:DNNSA rinsed with PTSA followed by IPA (bar 710), PANI rinsed with a mixture of DNNSA and IPA (bar 802), and a Thymol rinse (bar 804). These materials are disposed on and/or in carbon allotrope material, such as carbon nanotubes, graphenes, fullerenes, polycarbonates, and combinations thereof, to form a second material with improved electrical and mechanical properties. In at least one aspect, a material is disposed on and/or in carbon allotrope material to form a second material, followed by rinsing the second material with any suitable rinsing agent. Overall, impedance and conductivity of materials of the present disclosure may be tuned to a desired impedance and conductivity by applying a rinsing agent to a surface of a material.

Comparative Example: PANIPOL and PANIPLAST

Figure 9:
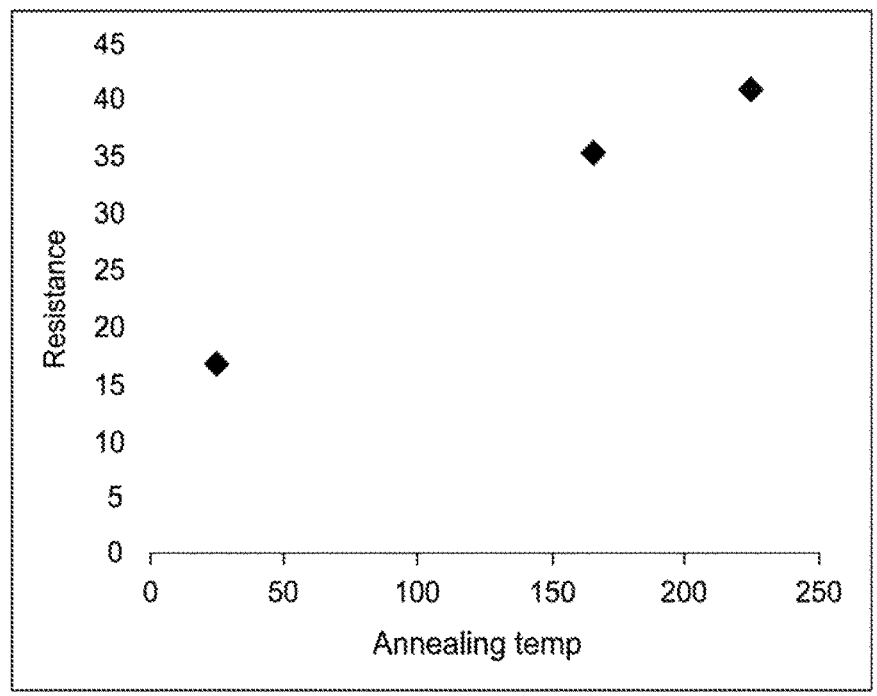
FIG. 9 illustrates resistance (in kOhms) versus annealing temperature for a PANIPOL material cast from toluene, according to some aspects of the present disclosure.

PANIPOL is a dodecylbenzene sulfonic acid(DBSA)-doped, highly conductive polymer (prior to material rinsing, unlike PANI:DNNSA) that is slightly soluble in toluene and may be used in polyurethane coatings. Materials comprising PANIPOL may be formed from dispersions of the polymer in toluene and xylene. The sheet resistances of these dispersions are 12.8 and 16.2Ω, respectively. The polymer is only slightly soluble in a number of solvents, such as xylenes and toluene, and thus casts a rough material onto a substrate. The roughness of the materials hinders "airworthiness" of PANIPOL materials because the materials are more susceptible to cracking, rendering underlying layers/substrate susceptible to chemical and UV damage. FIG. 9 illustrates resistance (in kOhms) versus annealing temperature for a PANIPOL material cast from toluene. As shown in FIG. 9, an increase in annealing temperature increases the resistance of a PANIPOL material (data points shown as solid diamonds).

Synthesis of PANIPOL may include isolating an insoluble and insulating powder of PANI:DBSA. Alternatively, synthesis of PANIPOL may include not crashing the polymer out of solution and casting materials of the dissolved polymer from p-xylene. Typically these materials measured a sheet resistance of several to hundreds of kΩ.

In one synthesis run in 2-butoxyethanol, similar to the PANI:DNNSA synthesis described above, the polymer was completely dried from solution (instead of crashing out of the xylene solution). However, these solids were found to be insoluble in a variety of solvents. Nonetheless, after being resuspended in a large amount of xylene and isolated by filtration, the material appeared similar to the commercially available PANIPOL and dispensed as a material which measured 14Ω.

The synthesized PANIPOL may be less conductive than the commercially available PAN IPOL because crashing the polymer out of solution in water removes a critical amount of the counterion, DBSA. An alternate synthesis was designed around creating the polyaniline base and then redoping with DBSA. This synthesis led to a sufficiently conductive polymer paste. Conductivity values for these materials are shown in Table 3.

TABLE 3

Conductivity values for PANI-b to PANI:DBSA samples

| Sample | σ (Scm$^{-1}$) |
|---|---|
| 1 | 6.729 |
| 2 | 5.754 |
| 3 in toluene | 3.672 |

Commercially available PANIPOL is slightly soluble in toluene and can be isolated by suspending in toluene and decanting off the dissolved polymer. This solution was diluted and compared to the absorption of a very dilute and filtered solution of newly synthesized PANI:DBSA, as described above. PANIPOL absorbs at a higher energy than the newly synthesized PANI:DBSA. The absorption peak is also broader for the newly synthesized PANI:DBSA, indicative of a loss of dopant. The singly-doped polaron state introduces a lower energy absorption at $\Omega_1$ eV, as well as an optically allowed transition to a state at CB-$\Omega_1$, while the double-doped bipolaron, has a slightly higher energy absorption at $\Omega_1'$. Thus, when considering the absorption, it is plausible that the broadening to a lower energy transition in the PANI:DBSA fill is the conversion (dedoping) of some of the bipolaron transitions to single polarons. This would mean the material is losing DBSA and this may be the cause of the conductivity difference.

Efforts to rinse the PANI:DBSA materials were performed but only modest conductivity increases were observed, as shown in Table 4. Note that the water dipped sample was on an otherwise high resistance material. Material treatment in water did show a significant change, which again may be due to removal of the DBSA dopant which is soluble in water.

TABLE 4

Material treatments and resistance changes in PANI:DBSA materials.

| Treatment | PTSA | PTSA/PTSAM | MeOH | $H_2O$ |
|---|---|---|---|---|
| Conductivity Increase | 2.3× | 1.5× | 0.3× | 100× |

Similar to PANIPOL, PANIPLAST is a material of polyaniline and a polyamine/amide dopant. PANIPLAST also has limited solubility in ethylene glycol, xylene, water and methanol. PANIPLAST is a dispersion that is difficult to filter through a 0.25 micron filter. Coatings like PANIPLAST are conductive but need to be brush applied to a surface. A coating from a dispersion of 7.7 grams in 6.4 grams of water was applied to a 4"×6" panel and dried at 70° C. The PANIPLAST yielded a resistance between about 1 kOhms and about 2.2. kOhms.

Overall, the roughness of the deposited PANIPOL and PANIPLAST materials hinders "airworthiness" of these materials because the materials are more susceptible to cracking, rendering underlying layers/substrate susceptible to chemical and UV damage. Furthermore, rinsing PANIPOL materials only moderately decreases resistance of the materials and does not increase the density of the materials.

Example 6: Polyaniline into Epoxy

Conventional surface coatings lack compatibility with underlying surfaces and/or a polymer mixed with other components of the surface coating. For example, epoxy resins have many desirable physical properties but are nonetheless reactive to a large number of nucleophilic compounds, such as anilines, such as PANI. Undesired reactivity results in precipitation and/or agglomeration of byproducts. It has been discovered that dissolution of a reactive species such as polyaniline in a compatible solvent promotes dispersibility which reduces undesired reactivity with reactive surfaces and/or a polymer, such as polyurethane, mixed with the reactive species. Dissolution of the reactive species promotes formation of a compatible, airworthy material that may be disposed onto a surface of a vehicle component or onto and/or in a carbon allotrope material disposed on a vehicle component. This aspect underscores surface coating compatibility with surrounding material in addition to having the desired physical properties for airworthiness. Suitable solvents for polyanilines comprise xylenes, toluene, benzene, and mixtures thereof. Suitable solvents for PEDOT:PSS comprise polar protic solvents such as water and DMSO.

Figure 10:
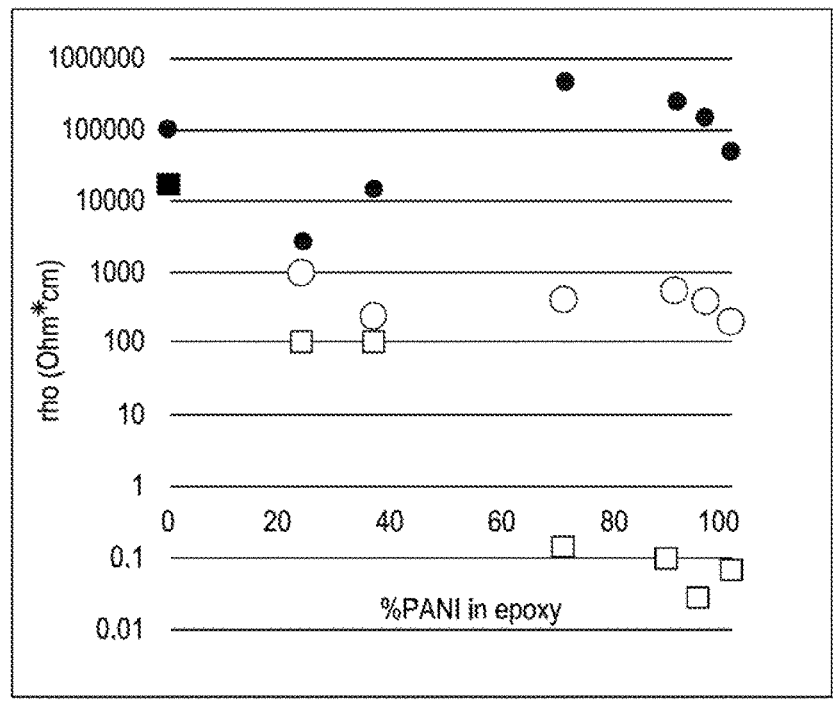
FIG. 10 illustrates resistivity of PANI:DNNSA in epoxy coating versus % PANI in epoxy and treated with various rinsing agents, according to some aspects of the present disclosure.

For example, PANI:DNNSA was incorporated into a high temperature cure epoxy. Solutions were manually mixed then placed in a Thinky mixer at 1000 rpm for 10 min. PANI:DNNSA was visibly crashing out of the epoxy solution (a very low viscosity solution). Solutions were drop cast onto 4-pt electrodes, with electrode spacing of 2 mm and length of 6 mm, and dried at 120° C. in air for an hour. Simple two point resistance measurements were made and the material thickness measured to calculate the material resistivity. FIG. 10 illustrates resistivity of PANI:DNNSA in epoxy coating versus % PANI in epoxy and treated with various rinsing agents. As shown in FIG. 10, resistivity of PANI:DNNSA:epoxy materials decreases from as-cast material (solid circles) to IPA dipped material (hollow circles), IPA dipped material followed by PTSA dip (solid squares), and IPA rinse followed by a second IPA rinse (hollow squares).

Prior to secondary treatments, PANI:DNNSA:epoxy materials show no obvious trend relating polymer loading to conductivity. Even at PANI:DNNSA loadings of ~20% with no secondary treatment, the conductivity may fall into a sufficient conductivity threshold for some electrostatic dissipative coatings. After dipping the materials in IPA, the materials provide a trend of increasing conductivity with increasing PANI:DNNSA loading.

Furthermore, a measurable conductivity was obtained for the epoxy coating containing no PANI after the PTSA dip, which is possibly due to ionic conductivity, as opposed to electrical conductivity.

PANI:DNNSA may be mobile in the cured epoxy coating. Material treatment, for example dipping, provides increased material conductivity. Without being bound by theory, the increased conductivity of the PANI:DNNSA:epoxy coatings may be due to removal of excess aniline, acid and/or rinsing agent-induced changes to the microstructure of the deposited material.

An alternative method to temper the reactivity of polyaniline with epoxy comprises adding polyaniline slowly to an epoxy surface, followed by a slow increase of curing temperature before reaching a final curing temperature. Overall reactivity between PANI:DNNSA with epoxy may be further controlled by peak curing temperatures and/or curing times.

These materials are disposed on and/or in carbon allotrope material, such as carbon nanotubes, graphenes, fullerenes, polycarbonates, and combinations thereof, to form a second material with improved electrical and mechanical properties.

Example 7: Thermoplastics: PANI:DNNSA in Butvar B90 and PEDOT:PSS in Butvar B90

Butvar B90 is a tri-block polymer containing polyvinyl butyral (PVB), polyvinyl alcohol and polyvinyl acetate as shown below, where x, y, and z are each a positive integer.

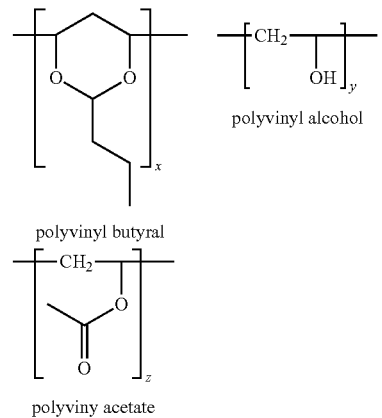

Butvar B90 may be used as a base resin in thermoplastic coatings, as well as combined with thermoset material(s) to make thermoset resins. In Example 7, PVB was combined with PEDOT:PSS and PANI:DNNSA as surface resistance (Ω/□) and pencil hardness were measured. Several samples also included the addition of a reactive epoxy component (e.g., EPON 1007-CT-55: a diglycidyl ether Bisphenol A) that reacts with the alcohol group of Butvar B90, which adds strength to the coating.

Solutions of PVB were made by dissolving 10% wt PVB into a premade solution of 40/60 methanol/toluene. A Teflon coated metallic stir bar was added to the flat-bottomed jar and placed to stir at ambient temperature for 1-3 hours until dissolved.

Samples were prepared by adding PVB solution into a flask and then adding any EPON or $H_3PO_4$ mixing in a Thinky mixer or by vortexer and allowing it to set for 30 minutes. A specific loading of PANI:DNNSA was added, and the samples were vortex mixed. Samples were then made by painting the coating onto glass slides with a small paint brush.

Initial formulations were begun with PEDOT:PSS, which were all very high resistance coatings, but PANI:DNNSA was added to the B90/EPON/surfactant mixture at 20% by weight and measured a resistance of 3.3 MΩ. In follow up studies, additional materials were tested. The materials tested are shown in Table 5 below.

TABLE 5

PVB, PANI:DNNSA

| Sample | PANI:DNNSA | PVB | EPON | $H_3PO_4$ | Surface Resistance (Ω/□) | Pencil Hardness[a] | Color | Appearance |
|---|---|---|---|---|---|---|---|---|
| 1 | 0.185 | 0.357 | 0.357 | 0.100 | 156000 | 0 | Green | translucent, orange peel |
| 2 | 0.000 | 0.900 | 0.000 | 0.100 | 5000000 | 3 | Clear | translucent, orange peel |
| 3 | 0.500 | 0.400 | 0.000 | 0.100 | 9300 | 0 | Green | opaque, bumpy |
| 4 | 0.500 | 0.000 | 0.400 | 0.100 | NA | NA | NA | |
| 5 | 0.000 | 0.500 | 0.500 | 0.000 | 5000000 | 3 | White | opaque, bumpy |
| 6 | 0.500 | 0.000 | 0.500 | 0.000 | 712000 | 0 | Green | semiopaque |
| 7 | 0.246 | 0.754 | 0.000 | 0.000 | 48750 | 3 | Green | translucent, rough |
| 8 | 0.000 | 0.000 | 0.900 | 0.100 | NA | NA | NA | |
| 9 | 0.500 | 0.500 | 0.000 | 0.000 | 43750 | 0 | Green | opaque, rough |
| 10 | 0.250 | 0.000 | 0.750 | 0.000 | 389500 | 0 | Green | semiopaque, smooth glossy |

[a] = pencil hardness: the letter designation scale has been changed to a numerical scale (0-14). Pencil hardness results fell into either too soft to measure on the scale, a '0', or a '3'.

Thus, hardness of materials of the present disclosure may be tuned by comprising polyvinyl butyral in one or more materials, further improving "airworthiness" of materials such as surface coatings due, at least in part, to increased hardness of the materials. In at least one aspect, materials of the present disclosure comprises about 25 wt % PANI:DNNSA and about 75 wt % polyvinyl butyral, such as Butvar B90. In at least one aspect, materials of the present disclosure comprises about 6% PANI:DNNSA in polyvinyl butyral, with no EPON or phosphoric acid.

These materials are disposed on and/or in carbon allotrope material, such as carbon nanotubes, graphenes, fullerenes, polycarbonates, and combinations thereof, to form a second material with improved electrical and mechanical properties.

Example 8:
Polyethylenedioxythiophene:Polystyrene Sulfonate (PEDOT:PSS) in a Sol-Gel PEDOT is a conductive polymer with a high intrinsic conductivity. It may be used as an electron-selective transport material in organic photovoltaics and may be used in coatings for static dissipation. For Example 8, commercially available PEDOT:PSS was incorporated into Boegel, a glycidyl-Si—Zr-containing solgel adhesion-promoting pretreatment for, for example, Alclad surfaces.

PEDOT:PSS was added and mixed on a vortex mixer to newly combined prepared solutions of the solgel. In some higher loading of PEDOT:PSS the solgel rapidly gelled, indicating a reaction between the epoxy moieties of the solgel and the conductive polymer.

Figure 11:
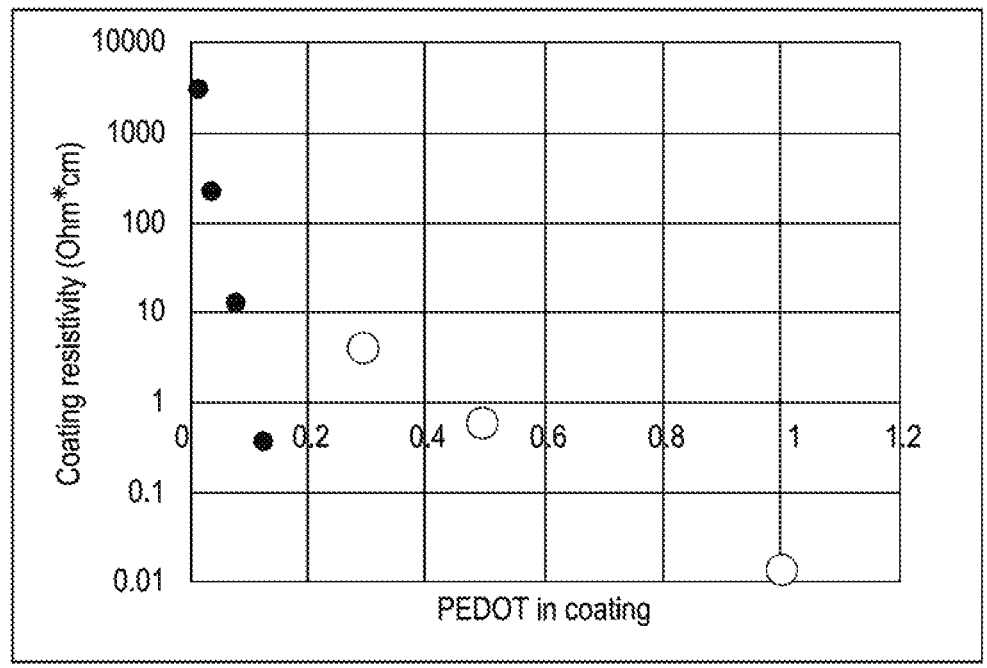
FIG. 11 illustrates resistivity of PEDOT:PSS materials at different amounts of PEDOT:PSS in a material, according to some aspects of the present disclosure.

FIG. 11 illustrates resistivity of PEDOT:PSS materials at different amounts of PEDOT:PSS in a material. As shown in FIG. 11, resistivity of an epoxy-based material (solid circles) reduces sharply as the amount of PEDOT:PSS is increased. Resistivity of a sol-gel based material (Boegel) also decreases with increased PEDOT:PSS content (hollow circles), but the decrease is not as sharp as compared to the epoxy-based materials.

There are several observable trends in the data: (1) PEDOT:PSS loaded epoxy shows measureable conductivity at much lower loading thresholds (demonstrating a sub 16% IPN.). (2) Pure PEDOT has a conductivity approaching 100 S/cm. (3) The PEDOT:PSS formulations require no secondary treatments (such as IPA rinse) and also show a much lower loading threshold for creating conductive coatings.

These materials are disposed on and/or in carbon allotrope material, such as carbon nanotubes, graphenes, fullerenes, polycarbonates, and combinations thereof, to form a second material with improved electrical and mechanical properties.

Surfactants and PEDOT:PSS in Epoxy:

A high temperature cure epoxy resin was used to test the efficacy of several commercial dispersants to disperse PEDOT:PSS. A comparison between samples of PEDOT:PSS with loading levels ranging from 0.1% to 2.0% in epoxy containing a Lubrizol Solplus R700 dispersant to samples with no dispersant. The PEDOT:PSS in all samples was observed to phase separate, yet the Solplus containing samples showed a dramatic reduction in particle aggregation. Samples containing Solplus R700 were less resistive, particularly at low loading levels.

A comparison between dispersants at a single PEDOT:PSS loading level (1.0%): The dispersants being compared are all from Lubrizol Solplus, R700, R710 and DP700. Samples were prepared as described above (Example 8).

Samples with R700 and R710 showed the best PEDOT:PSS dispersion (visually) while R710 had the lowest resistance (6.73 MΩ/☐). For aqueous PEDOT:PSS solutions, R710 is sufficient to dispersing the polymer in organic-phase coating resins.

A polymer blend that gives higher conductivity as as-cast materials was also investigated: PANI:DNNSA-PTSA with epoxy. These samples were prepared with loading levels of 0.02-0.2% and none had measureable resistances.

These materials are disposed on and/or in carbon allotrope material, such as carbon nanotubes, graphenes, fullerenes, polycarbonates, and combinations thereof, to form a second material with improved electrical and mechanical properties.

Multilayer Stacks

Aspects of the present disclosure comprise materials deposited onto a substrate as multiple layers to form a multilayer stack. In at least one aspect, a multilayer stack provides a lower overall electrical resistance as compared to a single layer of the same material and thickness. A multilayer stack may also provide increased strength of the overall coating/surface of, for example, a vehicle component.

A multilayer stack comprises one or more polymer layers, each layer independently selected from PANI:DNNSA, PEDOT:PSS, polyurethanes, acrylates, polyvinyl butyrals, or mixtures thereof. The one or more layers comprises a sulfonic acid, such as a sulfonic acid, such as DNNSA. The one or more layers comprises a carbon allotrope material, such as carbon nanotubes, graphenes, fullerenes, polycarbonates, and combinations thereof.

A multilayer stack may also provide one or more conductive layers for use as a heating layer, e.g. deicing applications, as explained in more detail below. In at least one aspect, a multilayer stack comprises an outer protective layer disposed over an electrically conductive layer. As used herein, the term "outer" layer may be a layer having no additional layer deposited onto the outer layer, the outer layer being the layer directly exposed to the environment.

Example 9: Multilayer Stack

Example 9 is 4-layer multilayer stack where each layer is PANI:DNNSA that is rinsed with IPA after deposition of each layer. Thicknesses and surface resistance values for the multilayerstack after each deposition and rinsing are shown below in Table 6. Resistances below 100Ω/☐ were achieved with the IPA treated samples.

TABLE 6

Average Resistance and thickness measurements for neat and IPA treated PANI/DNNSA.

| | | Sample 1 | Sample 2 | Sample 3 | Sample 4 |
|---|---|---|---|---|---|
| Layer 1 | Thickness (μm) | 17.034 | 13.7914 | 15.9964 | 15.2887 |
| | Resistance (Ω/☐) | 5.37E+07 | 5.08E+07 | 5.68E+07 | 3.07E+07 |
| Layer 1 after IPA wash | Thickness (μm) | 9.6941 | 9.8854 | 9.6468 | 8.93 |
| | Resistance (Ω/☐) | 3.35E+01 | 3.20E+01 | 2.77E+01 | 3.18E+01 |
| Layer 2 | Thickness (μm) | 94.234 | 65.024 | 57.404 | 38.862 |
| | Resistance (Ω/☐) | 1.40E+07 | 1.79E+07 | 1.03E+07 | 1.36E+07 |

TABLE 6-continued

Average Resistance and thickness measurements for neat and IPA treated PANI/DNNSA.

| | | Sample 1 | Sample 2 | Sample 3 | Sample 4 |
|---|---|---|---|---|---|
| Layer 2 after IPA wash | Thickness (μm) | 89.916 | 26.924 | 32.766 | 22.098 |
| | Resistance (Ω/☐) | 1.31E+01 | 1.26E+01 | 1.31E+01 | 1.28E+01 |
| Layer 3 | Thickness (μm) | 108.204 | 52.07 | 57.912 | 44.704 |
| | Resistance (Ω/☐) | 3.85E+06 | 3.43E+06 | 5.16E+05 | 1.50E+06 |
| Layer 3 after IPA wash | Thickness (μm) | 100.838 | 37.846 | 48.768 | 40.132 |
| | Resistance (Ω/☐) | 1.33E+04 | 6.82E+03 | 1.69E+04 | 2.57E+04 |
| Layer 4 | Thickness (μm) | 136.906 | 67.31 | 75.184 | 72.39 |
| | Resistance (Ω/☐) | 8.08E+04 | 4.87E+04 | 8.48E+04 | 1.35E+05 |
| Layer 4 after IPA wash | Thickness (μm) | 108.966 | 44.45 | 51.054 | 64.008 |
| | Resistance (Ω/☐) | 5.70E+02 | 5.70E+01 | 7.33E+01 | 1.80E+02 |

In at least one aspect, the one or more layers comprises a carbon allotrope material, such as carbon nanotubes, graphenes, fullerenes, polycarbonates, and combinations thereof.

Material Applications

Non-limiting examples for uses of materials of the present disclosure comprise uses as a thermoplastic and/or as a component of prepreg material. For prepreg material, materials of the present disclosure may be disposed on and/or in fiber materials composed of graphite, fiberglass, nylon, Kevlar® and related materials (for example, other aramid polymers), polyethylenes, among others.

Materials of the present disclosure may be deposited onto a carbon allotrope material to form a second material that may be deposited onto a surface of a substrate, such as a vehicle component. Vehicle components include a structural component such as a panel or joint of an aircraft, automobile, etc. A vehicle component comprisesa nose, a fuel tank, a tail cone, a panel, a coated lap joint between two or more panels, a wing-to-fuselage assembly, structural aircraft composite, fuselage body-joint, wing rib-to-skin joint, and/or other internal component.

Deposition includes, but is not limited to, dipping, spraying, brush coating, spin coating, roll coating, doctor-blade coating, and mixtures thereof. Materials of the present disclosure may be deposited to form a layer on a substrate, such as a layer on a surface of a vehicle component, at a range of thicknesses, such as between about 0.1 μm and about 20 mm, such as between about 1 μm and about 10 μm, such as between about 1 μm and about 8 μm, such as between about 2 μm and about 6 μm. Material thickness isutilized to tune conductivity and resistance of a deposited material. Material thickness may also be utilized to further tune "airworthiness" properties (such as rain erosion and resistance to sand and hail damage) of the material and resulting coated substrate.

After a material is deposited onto a substrate, a material may be cured at any suitable temperature, e.g. to evaporate solvent. Curing may be performed using any suitable curing apparatus. For curing, a temperature of a material may be raised gradually to a peak curing temperature at which a peak curing temperature remains constant for a period of time. A peak curing temperature may be between about room temperature and about 200° C., such as between about 70° C. and about 150° C. Materials may be cured for a period of time of between about 1 second and about 48 hours, such as between about 1 minute and about 10 hours.

Spraying to Deposit a Material on and/or in a Sheet Material:

A sheet material is disposed onto a substrate. One or more polymers is mixed with a suitable solvent (e.g., xylenes, toluene, water, etc.) and sprayed on and/or in a sheet material until a sufficient layer thickness is achieved to obtain a desired surface resistance. A solvent may then evaporate at room temperature (or higher) forming a cured material layer on a surface of a substrate.

Additionally or alternatively, a carbon allotrope material, and one or more polymers is mixed with a suitable solvent (e.g., xylenes, toluene, water, etc.) and sprayed onto a substrate until a sufficient layer thickness is achieved to obtain a desired surface resistance. A solvent may then evaporate at room temperature (or higher) forming a conductive material layer. The conductive material layer is disposed on the substrate.

Figure 12:
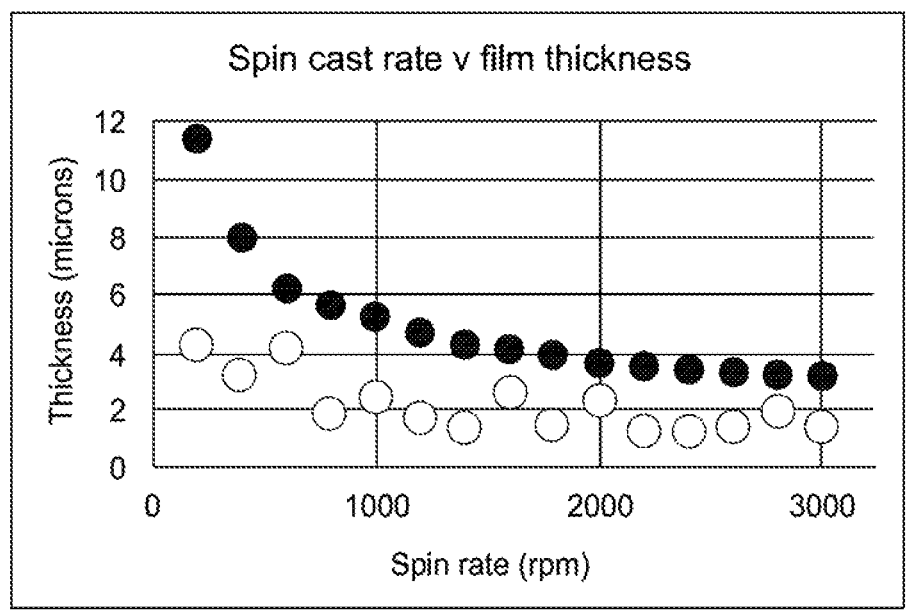
FIG. 12 illustrates spin rate versus material thickness, according to some aspects of the present disclosure.

Spin Coating to Deposit a Material onto a Substrate:

Material thickness is utilized to fine tune conductivity and resistance of a deposited material by, for example, spincoating PANI:DNNSA sheet onto substrates at different chuck rotations. FIG. 12 illustrates spin rate versus material thickness. As shown in FIG. 12, untreated materials (solid circles) are highly dependent on the casting spin rate. Interestingly, the difference in final material thickness diminishes after the materials have been treated (dipped in rinsing agent) (open circles). In at least one aspect, materials of the present disclosure are deposited by spin coating at a spin rate of between about 100 rotations per minute (rpm) and about 4,000 rpm, such as between about 1,000 rpm and about 3,000 rpm. In at least one aspect, a material is made of a sheet material.

Figure 13:
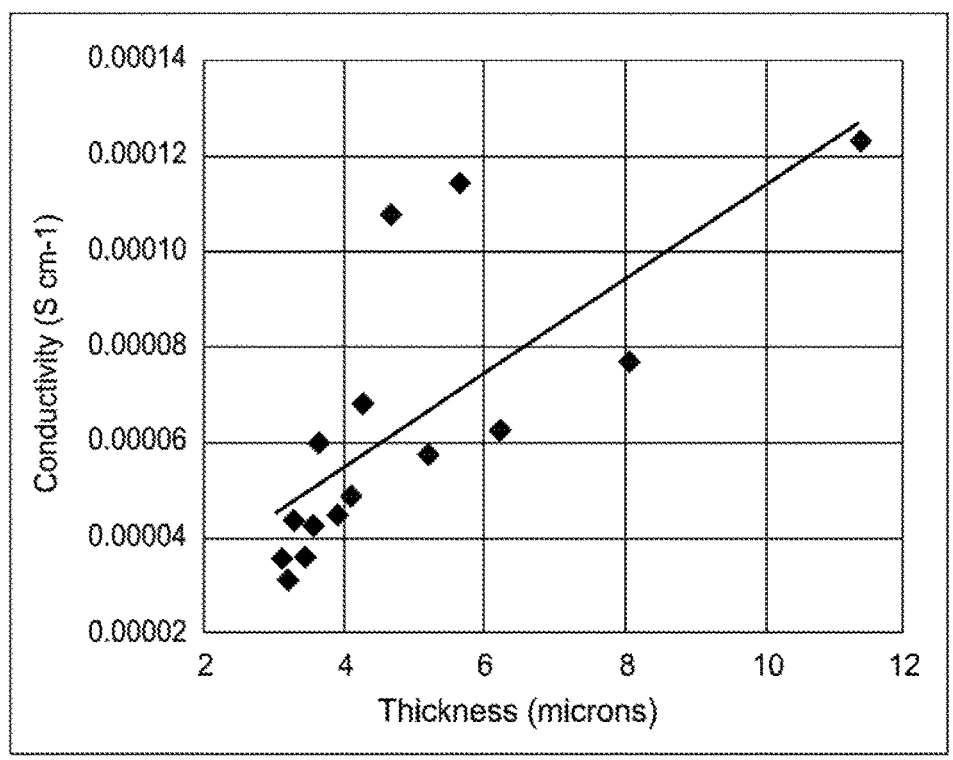
FIG. 13 illustrates conductivity versus thickness of as-deposited PANI:DNNSA films onto a substrate, according to some aspects of the present disclosure.

FIG. 13 illustrates conductivity versus thickness of as-deposited PANI:DNNSA films onto a substrate. Conductivity was again measured as a square resistance adjusted for the measurement dimensions. As shown in FIG. 13, conductivity has a linear trend as it increases with increasing thickness of the deposited material (data points shown as solid diamonds). Furthermore, a lack of correlation between conductivity and thickness for rinsing agent-treated (e.g., IPA rinse) samples was also observed (not shown in FIG. 13). In at least one aspect, a material comprises a carbon allotrope material. In at least one aspect, these materials are deposited by spin coating onto a carbon allotrope material.

Deicing:

After depositing one or more materials of the present disclosure onto a vehicle component (and optional curing), the vehicle component may be "deiced" if, for example, harsh weather conditions have resulted in accumulation of ice on one or more vehicle components. Because materials of the present disclosure are conductive, application of a voltage to a surface containing a material will result in increased temperature of the surface and melt a portion of the ice accumulated on the surface. In at least one aspect, the conductive material layer is an electrode. Additionally or alternatively, an electrode is attached to the conductive material layer.

In at least one aspect, a voltage is applied to a surface containing one or more materials of the present disclosure that provides complete melting of ice accumulation on the surface. In at least one aspect, a voltage is applied to a surface containing one or more materials of the present disclosure that provides partial melting of ice accumulation on the surface such that the partially melted ice accumulation slides off of the vehicle component.

In at least one aspect, deicing comprises contacting any suitable AC/DC voltage generator with a surface containing one or more materials of the present disclosure to provide a voltage to one or more materials. Contacting an AC voltage generator, for example, with a surface containing one or more materials (as a resistor) of the present disclosure provides resistive heating of at least the surface and may provide resistive heating of one or more layers of a vehicle component. In at least one aspect, deicing comprises providing voltage to a surface containing one or more materials of the present disclosure by electrically generating components of an aircraft. For example, an aircraft engine is switched to the active mode and the AC power provided by an aircraft engine transmits to a surface of the aircraft which deices one or more surfaces of vehicle components of the aircraft. These aspects provide intrinsic deicing of an aircraft without a need to apply an external voltage generator to a vehicle component surface of the aircraft.

In at least one aspect, methods comprise providing an AC voltage to a surface at between about 10 Hertz and about 2000 Hertz, such as between about 200 Hertz and about 600 Hertz, for example about 400 Hertz. In at least one aspect, methods comprise providing an AC voltage to a surface at between 10 volts and about 2000 volts, such as between about 100 volts and about 400 volts, for example about 200 volts. Methods comprise adjusting the AC voltage with one or more transformers. Methods comprise adjusting the AC voltage into DC voltage with one or more rectifiers. Methods comprise adjusting the DC voltage into AC voltage with one or more oscillators.

Radome and Other Electrostatic Dissipation:

In an aircraft, a radar is present behind the nose of the aircraft. The nose often times builds up a form of static electricity known as precipitation static (P-static).

After depositing one or more materials of the present disclosure onto a vehicle component (and optional curing), the one or more materials electrostatically dissipate static electricity such as P-static accumulated at a location on the aircraft, such as a nose of the aircraft. The electrostatic dissipation of static electricity provides reduced or eliminated electrostatic interference with a radar of the aircraft and reduced or eliminated brush discharge events resulting in reduced or eliminated damage to a coating on an outer surface of an aircraft. Materials of the present disclosure further provide reduced or eliminated electrostatic interference with other components of an aircraft, such as components that contain antenna(s).

Airworthiness:

In addition to an inability to dissipate charge buildup, conventional coatings are not otherwise "airworthy". For example, performance as to durability parameters such as rain erosion, resistance to UV light, resistance to high temperature, resistance to low temperature, and resistance to sand and hail damage are insufficient for conventional surface coatings on a surface of a vehicle such as an aircraft. Furthermore, for coatings of a canopy of a fighter jet and/or windshield/window of a commercial aircraft or fighter jet, coatings on these surfaces must be substantially clear to promote visibility through the surfaces. Materials of the present disclosure are "airworthy" and improve upon one or more parameters of airworthiness (as compared to conventional coatings) such as rain erosion, resistance to UV light, resistance to high temperature, resistance to low temperature, resistance to sand and hail damage, improved flexibility, and improved visibility.

In addition, if a conventional coating is mixed with additional chemicals to improve one or more desired physical properties of the coating, such as conductivity, the coating is often incompatible with the additional chemicals, negating desired physical properties of the additional chemicals added to the coating. Conventional coatings are also often incompatible with underlying surfaces/coatings leading to adhesion degradation at the coating-coating interface. In addition to the aforementioned applications and benefits, materials and methods of the present disclosure provide controlled formation of electrostatically dissipative, airworthy materials.

Materials and methods of the present disclosure provide low resistance materials (rinsed in a variety of rinsing agents), due at least in part to the removal of excess sulfonic acid and a densification of the material increasing the electrical percolation. Contrary to results using DNNSA, removal of excess DBSA prior to material casting leads to high resistance materials.

PANI and PEDOT:PSS show promise as conductive polymers that can be formulated into materials deposited onto a vehicle component. Materials of the present disclosure containing PVBs (polyvinyl butyrals) are robust, easy to work with, meet electrostatic dissipative resistances, and are versatile to apply.

Furthermore, as compared to conventional ionic based coatings, materials and methods of the present disclosure provide reduced surfactant leach out over time in part because amounts of surfactant are reduced in the materials of the present disclosure as compared to conventional ionic based coatings. In addition, sulfonic acids of the present disclosure leach from the formulations to a much lesser extent than conventional surfactants of conventional ionic based coatings.

Materials of the present disclosure further provide viability in humid environments, viability at elevated temperatures, improved electrical properties and mechanical properties (e.g., improved flexibility) as compared to known materials.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope of the described aspects. The terminology used herein was chosen to, for example, best explain the principles of the aspects, the practical application or technical improvement over technologies found in the marketplace, or to enable others of ordinary skill in the art to understand the aspects disclosed herein.

As used herein, "carbon allotrope material" includes a material made of carbon capable of having two or more different three dimensional molecular configurations, such as, for example, nanotubular, planar, or spherical three dimensional molecular configuration.

As used herein, a "sheet material" includes a carbon allotrope material with a substantially planar dispersion.

As used herein, a "vehicle component" includes, but is not limited to, any component of a vehicle, such as a structural component, such as a panel or joint, of an aircraft, automobile, etc. The vehicle component comprises a nose, a fuel tank, a tail cone, a panel, a coated lap joint between two or more panels, a wing-to-fuselage assembly, structural aircraft composite, fuselage body-joint, wing rib-to-skin joint, and/ or other internal component. Vehicle components also include, but are not limited to, any suitable component of an automobile, marine vehicle, wind turbine, housing/ground structure, drilling apparatus, and the like.

As used herein, the term "material" includes, but is not limited to, mixtures, reaction products, and films/layers, such as thin films, that may be disposed onto a surface, such as a surface of a vehicle component.

As used herein, "unsubstituted" includes a molecule having a hydrogen atom at each position on the molecule that would otherwise be suitable to have a substituent.

As used herein, "substituted" includes a molecule having a substituent other than hydrogen that is bonded to a carbon atom or nitrogen atom.

As used herein, "layer" includes a material that at least partially covers a surface and has a thickness.

While the foregoing is directed to aspects of the present disclosure, other and further aspects of the present disclosure may be devised without departing from the basic scope thereof. Furthermore, while the foregoing is directed to polymers, materials, and methods as applied to the aerospace industry, aspects of the present disclosure may be directed to other applications not associated with an aircraft, such as applications in the automotive industry, marine industry, energy industry, wind turbines, and the like.

What is claimed is:

1. A method of forming an electrically conductive carbon allotrope material, the method comprising:
    depositing a carbon allotrope material onto a substrate by spin-coating the carbon allotrope material onto a surface of a vehicle component at a rate of from about 100 rpm to about 4,000 rpm;
    depositing a first material comprising a polymer and a sulfonic acid onto the carbon allotrope material to form a second material; and
    curing the second material.

2. The method of claim 1, wherein the carbon allotrope material is a sheet material.

3. The method of claim 2, wherein the carbon allotrope material comprises carbon nanotubes, graphenes, fullerenes, or combinations thereof.

4. The method of claim 1, further comprising rinsing the second material with a rinsing agent.

5. The method of claim 4, wherein the rinsing agent is selected from the group consisting of isopropyl alcohol, p-Toluenesulfonic acid, acetone, methanol, hydrates thereof, solvates thereof, and mixtures thereof.

6. The method of claim 4, wherein rinsing comprises spraying the rinsing agent onto a surface of the second material for about 1 second to about 10 minutes.

7. The method of claim 4, further comprising rinsing the second material with a second rinsing agent selected from the group consisting of isopropyl alcohol, p-Toluenesulfonic acid, acetone, methanol, hydrates thereof, solvates thereof, and mixtures thereof.

8. The method of claim 4, wherein rinsing comprises dipping the second material into the rinsing agent for about 1 second to about 1 minute.

9. The method of claim 4, wherein rinsing comprises spraying the rinsing agent onto a surface of a material of an amount of about 1 mL to about 25 kL.

10. The method of claim 1, further comprising dissolving the polymer in a solvent, wherein the solvent is selected from the group consisting of a xylene, a benzene, a toluene, dimethyl sulfoxide, water, and mixtures thereof.

11. The method of claim 1, wherein the second material is a layer having a thickness of about 0.1 μm to about 10 μm.

12. The method of claim 1, wherein curing comprises raising a temperature of the material to a peak curing temperature and maintaining the peak curing temperature for about 1 second to about 48 hours.

13. The method of claim 12, wherein a peak curing temperature is from about room temperature to about 200° C.

14. The method of claim 1, wherein the polymer comprises a polyaniline, a poly(ethylenedioxythiophene), a poly(styrenesulfonate), a polyurethane, a polyvinyl butyral, a polyacrylate, an epoxy, a glycidyl-Si—Zr-containing solgel, a polyester, a phenoxy resin, a polysulfide, or mixtures thereof.

15. The method of claim 14, further comprising dissolving the polymer in a solvent, wherein the solvent is selected from the group consisting of a xylene, a benzene, a toluene, dimethyl sulfoxide, water, and mixtures thereof.

16. The method of claim 14, wherein the second material is a layer having a thickness of from about 0.1 μm to about 10 μm.

17. The method of claim 14, wherein curing comprises raising a temperature of the material to a peak curing temperature and maintaining the peak curing temperature for about 1 second to about 48 hours.

18. The method of claim 17, wherein a peak curing temperature is from about room temperature to about 200° C.

19. The method of claim 14, wherein the carbon allotrope material is a sheet material.

20. The method of claim 19, wherein the carbon allotrope material comprises carbon nanotubes, graphenes, fullerenes, or combinations thereof.

21. The method of claim 14, further comprising rinsing the second material with a rinsing agent.

22. The method of claim 21, wherein the rinsing agent is selected from the group consisting of isopropyl alcohol, p-Toluenesulfonic acid, acetone, methanol, hydrates thereof, solvates thereof, and mixtures thereof.

23. The method of claim 21, further comprising rinsing the second material with a second rinsing agent selected from the group consisting of isopropyl alcohol, p-Toluenesulfonic acid, acetone, methanol, hydrates thereof, solvates thereof, and mixtures thereof.

24. The method of claim 14, wherein:
curing comprises raising a temperature of the material to a peak curing temperature from about room temperature to about 200° C. and maintaining the peak curing temperature for about 1 second to about 48 hours, and
the carbon allotrope material is a sheet material comprising carbon nanotubes, graphenes, fullerenes, or combinations thereof.

25. The method of claim 1, wherein depositing the carbon allotrope material onto the substrate by spin-coating the carbon allotrope material onto the surface of the vehicle component is performed at a rate of from about 1,500 rpm to about 2,000 rpm.

26. The method of claim 14, wherein the polymer is a polyaniline.

* * * * *